(12) United States Patent
Jung et al.

(10) Patent No.: US 11,785,378 B2
(45) Date of Patent: Oct. 10, 2023

(54) FOLDABLE ELECTRONIC APPARATUS INCLUDING PLURALITY OF AUDIO INPUT DEVICES

(71) Applicant: SAMSUNG ELECTRONICS CO., LTD., Suwon-si (KR)

(72) Inventors: Jaehong Jung, Suwon-si (KR); Minsoo Kim, Suwon-si (KR); Sangmin Lee, Suwon-si (KR); Jiwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/533,651

(22) Filed: Nov. 23, 2021

(65) Prior Publication Data

US 2022/0086565 A1    Mar. 17, 2022

Related U.S. Application Data

(63) Continuation of application No. PCT/KR2020/006543, filed on May 19, 2020.

(30) Foreign Application Priority Data

May 23, 2019   (KR) ........................ 10-2019-0060444

(51) Int. Cl.
*H04R 1/40* (2006.01)
*H04M 1/02* (2006.01)
*H04R 1/02* (2006.01)

(52) U.S. Cl.
CPC .......... *H04R 1/406* (2013.01); *H04M 1/0216* (2013.01); *H04M 1/0268* (2013.01); *H04R 1/02* (2013.01); *H04R 2499/15* (2013.01)

(58) Field of Classification Search
CPC ............ H04M 1/0214; H04M 1/0216; H04M 1/0245; H04M 1/6008; H04M 1/0268;
(Continued)

(56) References Cited

U.S. PATENT DOCUMENTS 9,894,439 B1 * 2/2018 Peeler ................ H04M 1/6008
11,019,427 B2   5/2021 Keum et al.
(Continued)

FOREIGN PATENT DOCUMENTS

JP    2006-186646    7/2006
JP    2009-5039      1/2009
(Continued)

OTHER PUBLICATIONS

International Search Report for PCT/KR2020/006543, dated Sep. 11, 2020, 3 pages.
(Continued)

*Primary Examiner* — Jason R Kurr
(74) *Attorney, Agent, or Firm* — Nixon & Vanderhye P.C.

(57) ABSTRACT

An electronic apparatus may include: a foldable housing which includes a hinge structure that can switch the foldable housing between a folding state or an unfolding state, a first housing structure that is connected to the hinge structure and includes a first face oriented in a first direction and a second face oriented in a second direction opposite to the first direction, and a second housing structure that is connected to the hinge structure, includes a third face oriented in a third direction and a fourth face oriented in a fourth direction opposite to the third direction, and comes into contact with the first housing structure by pivoting about the hinge structure; a first display which extends from the first face to the third face and forms the first face and the third face; a second display which forms at least a portion of the fourth (Continued)

face; and at least one audio input device which is disposed on at least one of the second face or the fourth face.

16 Claims, 21 Drawing Sheets

(58) Field of Classification Search
CPC .. H04M 2250/16; H04M 1/0235; H04R 1/02; H04R 1/406; H04R 2430/25; H04R 2499/15; H04R 2499/11
See application file for complete search history.

(56) References Cited

U.S. PATENT DOCUMENTS

| | | | |
|---|---|---|---|
| 2014/0179380 A1* | 6/2014 | Roh | H04M 1/6033 455/569.1 |
| 2014/0210740 A1 | 7/2014 | Lee | |
| 2015/0110275 A1 | 4/2015 | Tammi et al. | |
| 2015/0141074 A1 | 5/2015 | Shim et al. | |
| 2016/0066091 A1 | 3/2016 | Kum et al. | |
| 2016/0165341 A1* | 6/2016 | Benattar | G01S 3/801 381/92 |
| 2017/0045996 A1 | 2/2017 | Ke et al. | |
| 2017/0180527 A1 | 6/2017 | Yang | |
| 2018/0038948 A1 | 2/2018 | Kemppinen | |
| 2019/0018454 A1 | 1/2019 | Jung et al. | |
| 2019/0369668 A1 | 12/2019 | Kim et al. | |

FOREIGN PATENT DOCUMENTS

| | | |
|---|---|---|
| KR | 10-2014-0098384 | 8/2014 |
| KR | 10-2015-0099677 A | 9/2015 |
| KR | 10-2015-0125615 | 11/2015 |
| KR | 10-2016-0026585 | 3/2016 |
| KR | 10-2016-0026585 A | 3/2016 |
| KR | 10-2017-0086321 | 7/2017 |
| KR | 10-2018-0122210 A | 11/2018 |

OTHER PUBLICATIONS

Written Opinion of the ISA for PCT/KR2020/006543, dated Sep. 11, 2020, 3 pages.
Korean Notice of Patent Grant dated Aug. 1, 2023 for KR Application No. 10-2019-0060444.

* cited by examiner

FOLDABLE ELECTRONIC APPARATUS INCLUDING PLURALITY OF AUDIO INPUT DEVICES

CROSS-REFERENCE TO RELATED APPLICATIONS

This application is a continuation of International Application No. PCT/KR2020/006543 designating the United States, filed on May 19, 2020, in the Korean Intellectual Property Receiving Office and claiming priority to Korean Patent Application No. 10-2019-0060444, filed on May 23, 2019, in the Korean Intellectual Property Office, the disclosures of which are incorporated by reference herein in their entireties.

BACKGROUND

Field

Various embodiments relate to a foldable electronic device including a plurality of audio input devices for surround audio capture.

Description of Related Art

As the portability of electronic devices is improved and the performance of cameras or video players is improved, users of the portable electronic devices can provide excellent video contents by using the electronic devices. The users are showing the tendency of increasing a concern about not only visual video capture but also the quality of an acquired audio. For example, demand for distinction between long-range recording and short-range recording and/or a capture function for up/down and/or left/right audio forwarding is increasing.

The electronic device can provide a dual microphone mounting structure for stereo audio capture. For example, the electronic device can perform left/right stereo sound capture, through an upper microphone and a lower microphone of a housing.

When an electronic device includes a dual microphone, audio capture is just possible only for one axis such as up/down or left/right, and audio capture for one plane including up/down and/or left/right is impossible.

A foldable electronic device may need a plurality of microphones so as to provide a surround audio capture function. In a dual microphone, stereo capture is possible, but an additional microphone may be needed for the sake of 360-degree audio recording. It is to provide a foldable electronic device in which the 360-degree audio recording is possible when the foldable electronic device is unfolded and even when being folded.

SUMMARY

It is to provide a electronic device capable of optimizing the location of a plurality of microphones disposed in the foldable electronic device, to provide a surround audio capture function even in a folded/flat state.

An electronic device according to an example embodiment can include a foldable housing which includes a first surface oriented in a first direction in an unfolded state, a second surface oriented in a second direction opposite to the first direction, and a side surface formed between the first surface and the second surface, the foldable housing including a hinge structure which can switch the foldable housing to a folding state or an unfolding state, a first housing structure which is connected (directly or indirectly) to the hinge structure, and includes a first side member at least partially surrounding one space between the first surface and the second surface, and a second housing structure which is connected (directly or indirectly) to the hinge structure, and includes a second side member at least partially surrounding the remnant space between the first surface and the second surface, and is folded with the first housing structure by pivoting about the hinge structure, wherein a second surface of the first housing structure faces a second surface of the second housing structure in a folded state, and a first display which is formed in at least one surface of the foldable housing and overlaps with the first housing structure and the second housing structure, and is bendable by pivoting about a hinge shaft of the hinge structure, and an audio input device set (comprising audio input circuitry) which is disposed in at least one of the first housing structure or the second housing structure, wherein the audio input device set can include a first audio input device, comprising an audio conduit and/or circuitry, for inputting an audio of a third direction vertical to a first direction, a second audio input device, comprising an audio conduit and/or circuitry, for inputting an audio of a fourth direction opposite to the first direction, a third audio input device, comprising an audio conduit and/or circuitry, for inputting an audio of the first direction, and a fourth audio input device, comprising an audio conduit and/or circuitry, for inputting the audio of the first direction in an unfolded state and inputs an audio of the second direction in the folded state.

An electronic device according to an example embodiment can include a foldable housing which includes a hinge structure which can switch the foldable housing to a folding state or an unfolding state, a first housing structure which is connected (directly or indirectly) to the hinge structure, and includes a first surface oriented in a first direction and/or a second surface oriented in a second direction opposite to the first direction, and a second housing structure which is connected (directly or indirectly) to the hinge structure, and includes a third surface oriented in a third direction and/or a fourth surface oriented in a fourth direction opposite to the third direction, and comes into contact with the first housing structure by pivoting about the hinge structure, a first display which extends from the first surface to the third surface and forms the first surface and the third surface, a second display which forms at least a portion of the fourth surface, and at least one audio input device which is disposed in at least one of the second surface or the fourth surface.

According to various embodiments, a foldable electronic device including a plurality of audio input devices for audio capture can present surround audio capture in the foldable electronic device of a flat state.

According to various embodiments, a foldable electronic device including a plurality of audio input devices for audio capture can present surround audio capture even in a folded state.

BRIEF DESCRIPTION OF THE DRAWINGS

The above and other aspects, features and advantages of certain embodiments of the present disclosure will be more apparent from the following detailed description, taken in conjunction with the accompanying drawings, in which.

Each embodiment disclosed herein may be used in conjunction with any other embodiment disclosed herein.

DETAILED DESCRIPTION

Figure 1:
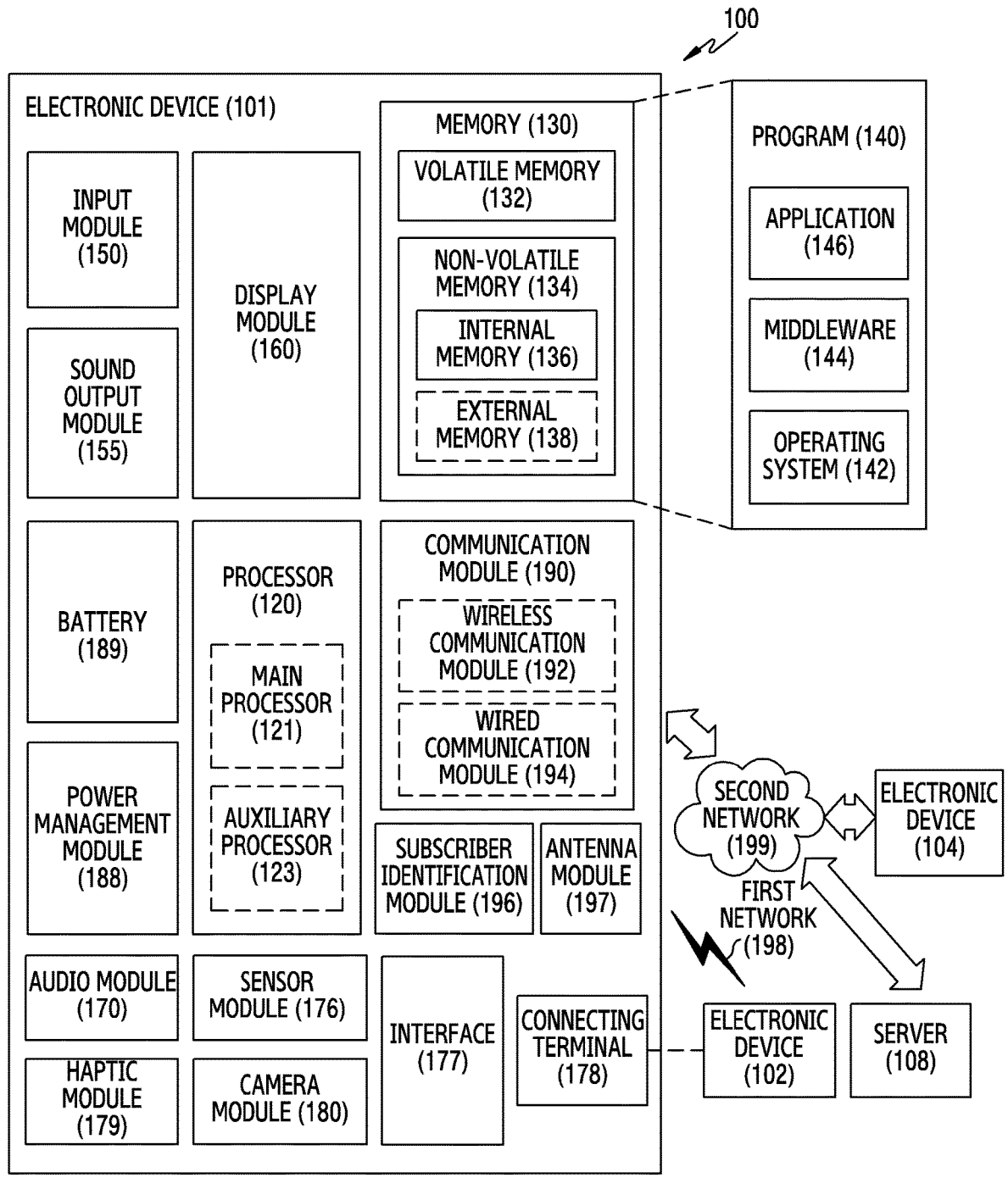
FIG. 1 is a block diagram of an electronic device within a network environment according to various example embodiments.

FIG. 1 is a block diagram illustrating an electronic device 101 in a network environment 100 according to various example embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170 (comprising audio circuitry), a sensor module 176 (comprising sensing circuitry), an interface 177, a haptic module 179 (comprising circuitry), a camera module 180 (comprising camera circuitry), a power management module 188 (comprising circuitry), a battery 189, a communication module 190 (comprising communication circuitry), a subscriber identification module (SIM) 196, or an antenna module 197 (comprising antenna(s)). In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 (comprising audio circuitry) may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 (comprising circuitry) may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element of or including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Each embodiment disclosed herein may be used in conjunction with any other embodiment disclosed herein.

Figure 2:
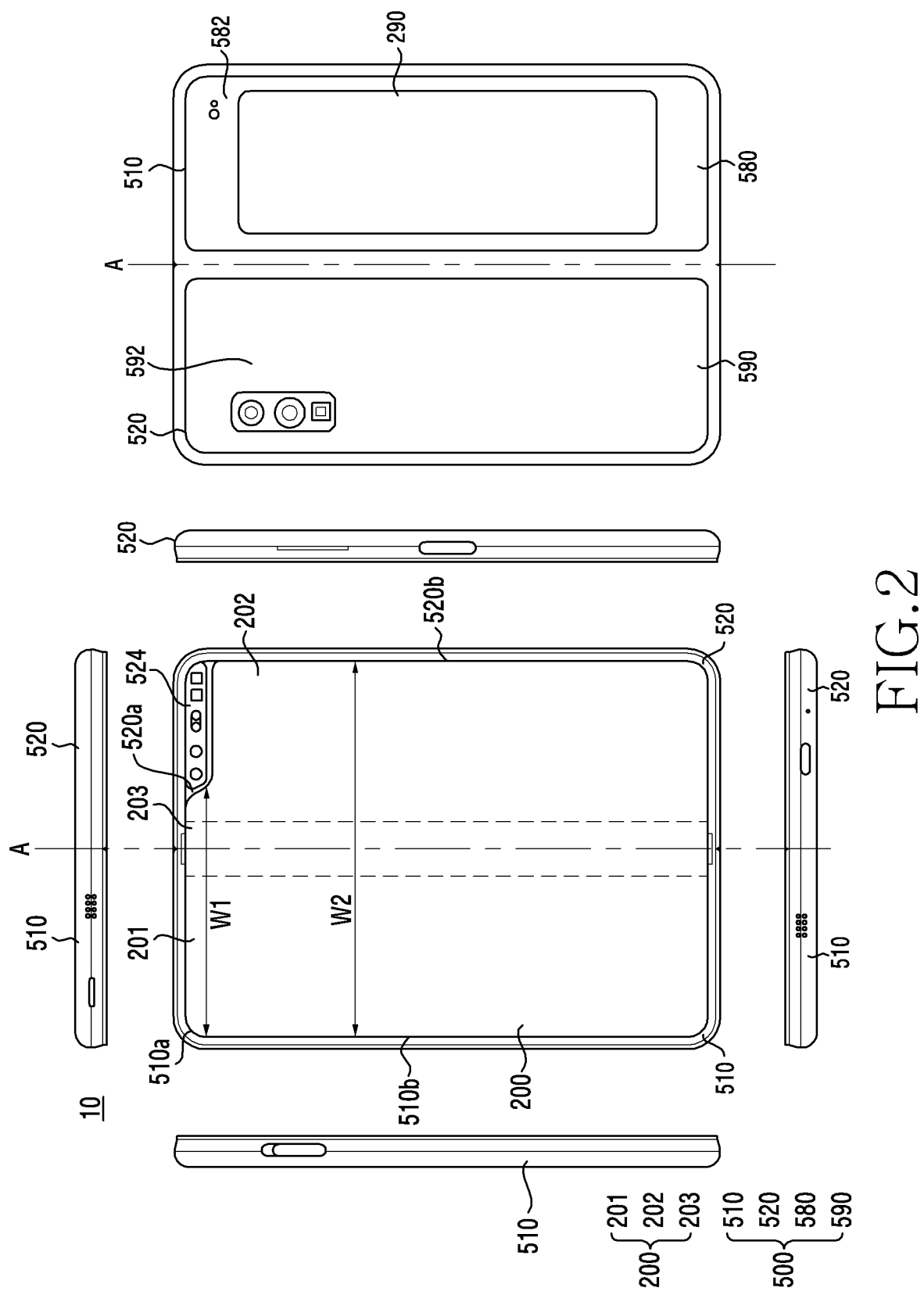
FIG. 2 is a diagram illustrating an unfolding state of an electronic device according to an example embodiment.
Figure 3:
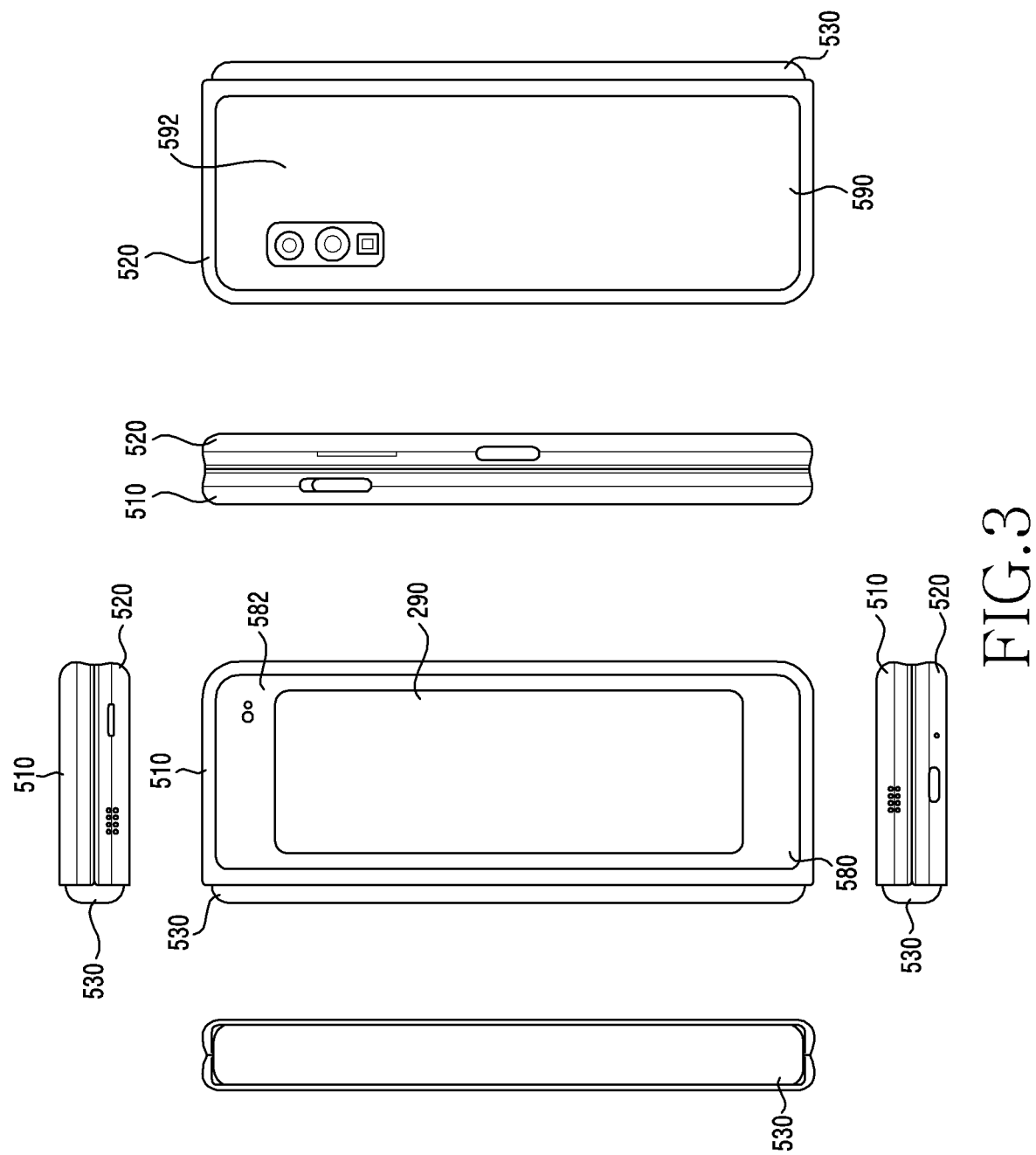
FIG. 3 is a diagram illustrating a folding state of an electronic device according to an example embodiment.

Referring to FIG. 2 and FIG. 3, in an example embodiment, an electronic device 10 (e.g., the electronic device 101) can include a foldable housing 500, a hinge cover 530 covering a foldable portion of the foldable housing, and a flexible and/or foldable display 200 (below, abbreviated to a "display" 200) disposed within a space formed by the foldable housing 500. A surface where the display 200 is disposed may be a first surface or the front surface of the electronic device 10. And, a surface opposite to the front surface is defined as a second surface or the rear surface of the electronic device 10. Also, a surface surrounding the space between the front surface and the rear surface may be a third surface and/or a side surface of the electronic device 10.

In an example embodiment, the foldable housing 500 can include a first housing structure 510, a second housing structure 520 including a sensor region 524, a first rear cover 580, and a second rear cover 590. The foldable housing 500 of the electronic device 10 is not limited to the form and coupling illustrated FIGS. 2 and 3, and can be implemented by the combination and/or coupling of other shapes or components. For example, in an embodiment, the first housing structure 510 and the first rear cover 580 can be integrally formed, and the second housing structure 520 and the second rear cover 590 can be integrally formed.

In an example embodiment illustrated, the first housing structure 510 and the second housing structure 520 can be disposed at both sides centering on a folding axis (axis A), and have a shape symmetric entirely with respect to the folding axis (A). As described later, an angle or distance formed between the first housing structure 510 and the second housing structure 520 can be different according to whether a state of the electronic device 10 is an unfolding state, a folding state, or an intermediate state. In an embodiment illustrated, unlike the first housing structure 510, the second housing structure 520 additionally includes the sensor region 524 where various sensors are disposed, but can have a mutually symmetric shape in other regions.

In an example embodiment, as illustrated in FIG. 2, the first housing structure 510 and the second housing structure 520 can form a recess accepting the display 200, together. In an embodiment illustrated, because of the sensor region 524, the recess can have mutually different two or more widths in a direction vertical to the folding axis (A).

For example, the recess can have (1) a first width (w1) between a first portion 510a parallel to the folding axis (A) among the first housing structure 510 and a first portion 520a formed in a periphery of the sensor region 524 among the second housing structure 520, and (2) a second width (w2) formed by a second portion 510b of the first housing structure 510 and a second portion 520b which does not correspond to the sensor region 524 among the second housing structure 520 and is parallel to the folding axis (A). In this case, the second width (w2) can be formed longer than the first width (w1). In other words, the first portion 510a of the first housing structure 510 and the first portion 520a of the second housing structure 520 having a mutually asymmetric shape can form the first width (w1) of the recess, and the second portion 510b of the first housing structure 510 and the second portion 520b of the second housing structure 520 having a mutually symmetric shape can form the second width (w2) of the recess. In an embodiment, the first portion 520a, and the second portion 520b, of the second housing structure 520 can have mutually different distances from the folding axis (A). The width of the recess is not limited to the illustrated example. In various embodiments, the recess can have a plurality of widths, by the form of the sensor region 524 or the asymmetric-shape portions of the first housing structure 510 and the second housing structure 520.

In an example embodiment, at least a portion of the first housing structure 510 and the second housing structure 520 can be formed of metal materials or non-metal materials having a rigidity of a selected magnitude so as to support the display 200.

In an example embodiment, the sensor region 524 can be formed to have a certain region in adjacent to one corner of the second housing structure 520. However, the disposition, shape, and size of the sensor region 524 are not limited to the illustrated example. For example, in an embodiment, the sensor region 524 can be presented to another corner of the second housing structure 520 or an arbitrary region between an upper corner and a lower corner. In an embodiment, components for performing various functions, built in the electronic device 10, can be exposed to the front surface of the electronic device 10 through the sensor region 524, or through one or more openings prepared in the sensor region 524. In various embodiments, the components can include various kinds of sensors. The sensor, for example, can include at least one of a front camera, a receiver, or a proximity sensor.

The first rear cover 580 can be disposed at one side of the folding axis in the rear surface of the electronic device 10 and can, for example, have a periphery of a substantially rectangular shape, and the periphery can be surrounded by the first housing structure 510. Similarly, the second rear cover 590 can be disposed at the other side of the folding axis of the rear surface of the electronic device 10, and its periphery can be surrounded by the second housing structure 520.

In an example embodiment illustrated, the first rear cover 580 and the second rear cover 590 can have a shape which is substantially symmetric centering on the folding axis (axis A). However, the first rear cover 580 and the second rear cover 590 do not necessarily have the mutually symmetric shape, and in an embodiment, the electronic device 10 can include the first rear cover 580 and the second rear cover 590 of various shapes. In further embodiment, the first rear cover 580 can be formed integrally with the first housing structure 510, and the second rear cover 590 can be formed integrally with the second housing structure 520.

In an embodiment, the first rear cover 580, the second rear cover 590, the first housing structure 510, and the second housing structure 520 can form a space where various components (e.g., a printed circuit board or a battery) of the electronic device 10 can be disposed. In an embodiment, one or more components can be disposed in the rear surface of the electronic device 10 or be visually exposed. For example, at least a portion of a sub display 290 can be visually exposed through a first rear region 582 of the first rear cover 580. In an embodiment, one or more components or sensors can be visually exposed through a second rear region 592 of the second rear cover 590. In various embodiments, the sensor can include a proximity sensor and/or a rear camera.

Referring to FIG. 3, the hinge cover 530 can be disposed between the first housing structure 510 and the second housing structure 520, and be configured to hide an internal component (for example, a hinge structure). In an embodiment, the hinge cover 530 can be hidden by a portion of the first housing structure 510 and the second housing structure 520 or be exposed to the external, according to a state (flat state or folded state) of the electronic device 10.

In one example, as illustrated in FIG. 2, in response to the electronic device 10 being in the flat state, the hinge cover 530 may not be exposed by being hidden by the first housing structure 510 and the second housing structure 520. In one example, as illustrated in FIG. 3, in response to the electronic device 10 being in the folded state (e.g., a fully folded state), the hinge cover 530 can be exposed externally between the first housing structure 510 and the second housing structure 520. In one example, in response to it being the intermediate state in which the first housing structure 510 and the second housing structure 520 are folded with a certain angle, the hinge cover 530 can be partially exposed externally between the first housing structure 510 and the second housing structure 520. However, in this case, the exposed region can be less than in the fully folded state. In an embodiment, the hinge cover 530 can include a curved surface.

The display 200 can be disposed in a space formed by the foldable housing 500. For example, the display 200 can be safely mounted on the recess formed by the foldable housing 500, and construct most of the front surface of the electronic device 10.

Accordingly, the front surface of the electronic device 10 can include the display 200, and a partial region of the first housing structure 510 and a partial region of the second housing structure 520 adjacent to the display 200. And, the rear surface of the electronic device 10 can include the first rear cover 580, a partial region of the first housing structure 510 adjacent to the first rear cover 580, the second rear cover 590, and a partial region of the second housing structure 520 adjacent to the second rear cover 590.

The display 200 can refer to a display of which at least a partial region can be deformed into a flat surface or a curved surface. In an embodiment, the display 200 can include a folding region 203, a first region 201 disposed at one side (the left side of the folding region 203 illustrated in FIG. 2) with a criterion of the folding region 203, and a second region 203 disposed at the other side (the right side of the folding region 203 illustrated in FIG. 2).

The division of the region of the display 200 illustrated in FIG. 2 is an example, and the display 200 can be divided into a plurality of (for example, four or more or two) regions according to a structure or function as well. In an example, in an embodiment illustrated in FIG. 2, the region of the display 200 can be divided by the folding region 203 extending in parallel to a y axis, or the folding axis (axis A), but in another example embodiment, the region of the display 200 can be divided with a criterion of another folding region (e.g., a folding region parallel to an x axis) or another folding axis (e.g., a folding axis parallel to the x axis) as well.

The first region 201 and the second region 202 can have a shape which is entirely symmetric centering on the folding region 203. However, unlike the first region 201, the second region 202 can include a notch which is cut according to the existence of the sensor region 524, but can have a shape which is symmetric with that of the first region 201 in other regions. In other words, the first region 201 and the second region 202 can include a portion having a mutually symmetric shape, and a portion having a mutually asymmetric shape.

Below, a description is made for operations of the first housing structure 510 and the second housing structure 520 dependent on the state (e.g., flat state and folded state) of the electronic device 10, and each region of the display 200.

In an example embodiment, in response to the electronic device 10 being in the flat state (e.g., FIG. 2), the first housing structure 510 and the second housing structure 520 can be disposed to form an angle of 180 degrees and go in the same direction. A surface of the first region 201 of the display 200 and a surface of the second region 202 can form 180 degrees mutually, and go in the same direction (e.g., a front direction of the electronic device). The folding region 203 can form the same plane as the first region 201 and the second region 202.

In an example embodiment, in response to the electronic device 10 being in the folded state (e.g., FIG. 3), the first housing structure 510 and the second housing structure 520 can be disposed to face each other. The surface of the first region 201 of the display 200 and the surface of the second region 202 can form a mutually narrow angle (e.g., between 0 degree and 10 degrees), and face each other. The folding region 203 can be formed as a curved surface of which at least a portion has a certain curvature.

In an example embodiment, in response to the electronic device 10 being in the intermediate state (e.g., FIG. 3), the first housing structure 510 and the second housing structure 520 can be disposed at a certain angle mutually. The surface of the first region 201 of the display 200 and the surface of the second region 202 can form an angle which is greater than in the folded state and is less than in the flat state. The folding region 203 can be formed as a curved surface of which at least a portion has a certain curvature, and at this time, the curvature can be less than that of the folded state.

Figure 4:
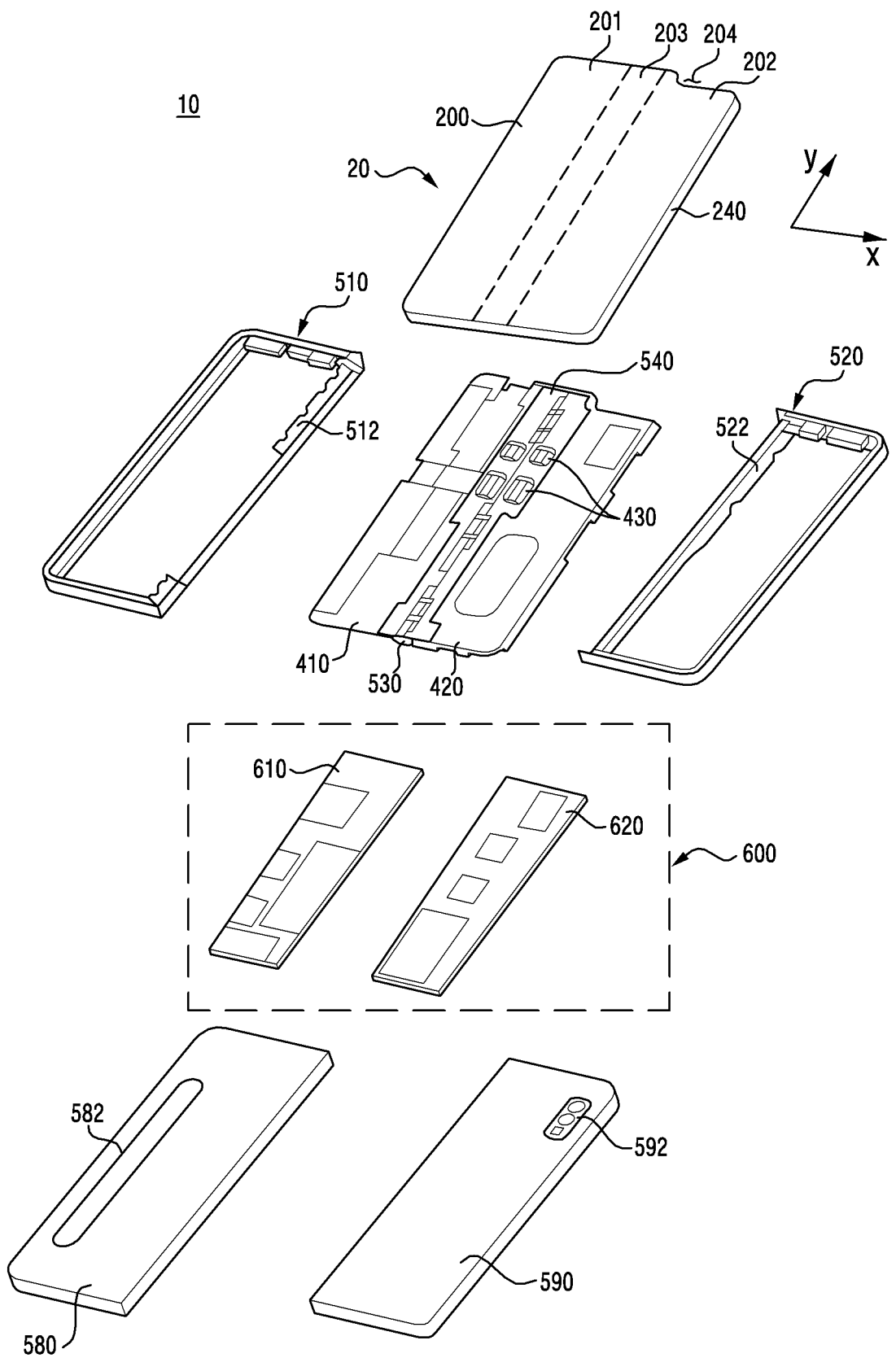
FIG. 4 is an exploded perspective diagram of an electronic device according to an example embodiment.

FIG. 4 is an exploded perspective diagram of an electronic device according to an example embodiment.

Referring to FIG. 4, in an embodiment, the electronic device 10 can include a display unit 20, a bracket assembly 30, a substrate unit 600, the first housing structure 510, the second housing structure 520, the first rear cover 580, and the second rear cover 590. The display unit 20 can be called a display module (comprising a display) or a display assembly.

The display unit 20 can include the display 200, and one or more plates or layers 240 in which the display 200 is safely mounted. In an embodiment, the plate 240 can be disposed between the display 200 and the bracket assembly 30. The display 200 can be disposed in at least a portion of one surface (e.g., a top surface in FIG. 4) of the plate 240. The plate 240 can be formed in a shape corresponding to the display 200. For example, a partial region of the plate 240 can be formed in a shape corresponding to the notch 204 of the display 200.

The bracket assembly 30 can include a first bracket 410, a second bracket 420, the hinge structure 540 disposed between the first bracket 410 and the second bracket 420, the hinge cover 530 covering the hinge structure 540 when viewed outside, and a wiring member 430 (e.g., a flexible printed circuit (FPC)) going across the first bracket 410 and the second bracket 420.

In an embodiment, the bracket assembly 30 can be disposed between the plate 240 and the substrate unit 600. In an example, the first bracket 410 can be disposed between the first region 201 of the display 200 and a first substrate 610. The second bracket 420 can be disposed between the second region 202 of the display 200 and a second substrate 620.

In an embodiment, the wiring member 430 and at least a portion of the hinge structure can be disposed within the bracket assembly 30. The wiring member 430 can be disposed in a direction (e.g., an x-axis direction) of going across the first bracket 410 and the second bracket 420. The wiring member 430 can be disposed in a direction (e.g., an x-axis direction) vertical to a folding axis (e.g., the y axis or the folding axis (A) of FIG. 2) of the folding region 203 of the electronic device 10.

The substrate unit 600 can, as mentioned above, include the first substrate 610 disposed at a first bracket 410 side, and the second substrate 620 disposed at a second bracket 420 side. The first substrate 610 and the second substrate 620 can be disposed within the space which is formed by the bracket assembly 30, the first housing structure 510, the second housing structure 520, the first rear cover 580, and the second rear cover 590. Components for implementing various functions of the electronic device 10 can be mounted in the first substrate 610 and the second substrate 620.

The first housing structure 510 and the second housing structure 520 can be mutually assembled to be coupled to both sides of the bracket assembly 30, in a state in which the display unit 20 is coupled to the bracket assembly 30. As described later, the first housing structure 510 and the second housing structure 520 can be slid at the both sides of the bracket assembly 30 and be coupled to the bracket assembly 30.

In an embodiment, the first housing structure 510 can include a first rotation support surface 512, and the second housing structure 520 can include a second rotation support surface 522 corresponding to the first rotation support surface 512. The first rotation support surface 512 and the second rotation support surface 522 can include a curved surface corresponding to the curved surface included in the hinge cover 530.

In an embodiment, in response to the electronic device 10 being in the flat state (e.g., the electronic device of FIG. 2), the first rotation support surface 512 and the second rotation support surface 522 can cover the hinge cover 530 and thus, the hinge cover 530 is not exposed, or can be exposed minimally, to the rear surface of the electronic device 10. On the other hand, in response to the electronic device 10 being in the folded state (e.g., the electronic device of FIG. 3), the first rotation support surface 512 and the second rotation support surface 522 can rotate along the curved surface included in the hinge cover 530 and thus, the hinge cover 530 can be exposed at least partially or maximally to the rear surface of the electronic device 10.

An electronic device of various example embodiments can be devices of various forms. The electronic device, for example, can include a portable communication device (e.g., a smart phone), a computer device, a portable multimedia device, a portable medical instrument, a camera, a wearable device, or a home appliance. The electronic device of an embodiment of the present document is not limited to the aforementioned devices.

Various example embodiments and the terms used herein are not to limit technological features mentioned in the present document to specific embodiments, and should be construed as including various modifications, equivalents, or alternatives of the corresponding embodiment. With regard to the description of the drawings, similar reference symbols can be used to refer to similar or related components. A singular form of a noun corresponding to an item can include one item or more, unless the relevant context clearly indicates otherwise. In the present document, each of such phrases as "A or B", "at least one of A and B", "at least one of A or B," "A, B, or C", "at least one of A, B, and C", and "at least one of A, B, or C" can include any one of the items enumerated together in a corresponding one of the phrases, or all possible combinations thereof. Such terms as "a first", "a second", or "the first" or "the second" can be used to simply distinguish a corresponding component from another corresponding component, and do not limit the corresponding components in another aspect (e.g., importance or sequence). If some (e.g., a first) component is referred to, with or without the term "operatively" or "communicatively", as "coupled with", "coupled to", "connected with", or "connected to" another (e.g., a second) component, it means that the some component can be connected with the another component directly (e.g., wiredly), wirelessly, or via a third component(s).

The term "module" used in the present document can include a unit implemented in hardware, software, or firmware, and can interchangeably be used with terms, for example, logic, logic block, part, circuitry or the like. The module can be a single integral part, or a minimum unit of the part or a portion thereof, adapted to perform one or more functions. For example, according to an embodiment, the module can be implemented in the form of an application-specific integrated circuit (ASIC).

Various example embodiments can be implemented as software (e.g., the program 140) that includes one or more instructions that are stored in a storage medium (e.g., the internal memory 136 or the external memory 138) that is readable by a machine (e.g., the electronic device 101). For example, a processor (e.g., at least the processor 120) of the machine (e.g., the electronic device 101) can invoke at least one of the one or more instructions stored in the storage medium, and execute it. This allows the machine to be operated to perform at least one function according to the at least one instruction invoked. The one or more instructions can include a code provided by a compiler or a code executable by an interpreter. The machine-readable storage media can be presented in the form of a non-transitory storage media. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method of various embodiments can be included in a computer program product and offered. The computer program product can be traded as a product between a seller and a buyer. The computer program product can be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least one portion of the computer program product can be at least temporarily stored, or temporarily provided in the machine-readable storage medium, such as a memory of a manufacturer's server, a server of an application store, or a relay server.

According to various embodiments, each component (e.g., a module or a program) of the above-described components can include a single entity or multiple entities. According to various embodiments, one or more components or operations among the above-described corresponding components can be omitted, or one or more other components or operations can be added. Alternatively or additionally, multiple components (e.g., modules or programs) can be integrated into a single component. In such a case, the integrated component can perform one or more functions of each of the multiple components in the same or similar manner as they are performed by a corresponding one of the multiple components before the integration. According to various embodiments, operations performed by the module, the program, or another component can be carried out sequentially, in parallel, repeatedly, or heuristically, or one or more of the operations can be executed in a different order or omitted, or one or more other operations can be added.

Figure 5:
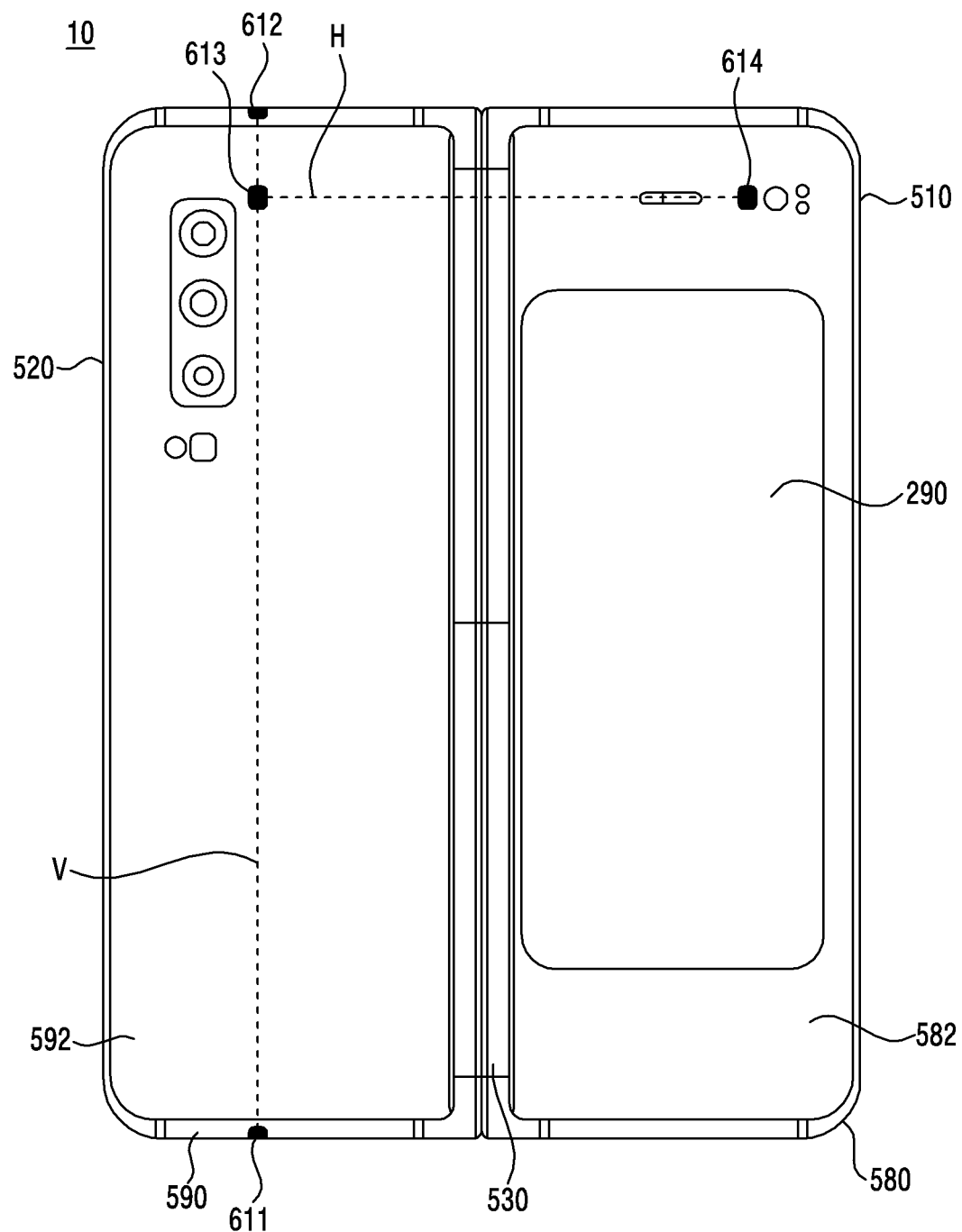
FIG. 5 is a rear diagram of an electronic device according to various example embodiments.

FIG. 5 is a rear diagram of an electronic device according to various example embodiments.

Referring to FIG. 5, the electronic device 10 can include the hinge structure 540, the first housing structure 510 connected (directly or indirectly) to one portion of the hinge structure 540, and the second housing structure 520 facing the first housing structure 510 and connected (directly or indirectly) to the other portion of the hinge structure 540. The hinge structure 540 can be partially surrounded by the hinge cover 530 and thus can be reduced or prevented from being exposed externally after the assembly of the electronic device 10.

The second display 290 can be disposed in the first rear surface 582 of the first housing structure 510, and a camera module (comprising circuitry) and a sensor can be disposed in/at the second rear surface 592 of the second housing structure 520.

According to an example embodiment, a first audio input device 611, a second audio input device 612, a third audio input device 613, and a fourth audio input device 614 can be microphones capable of receiving a voice. The first audio input device 611 and the second audio input device 612 can be disposed in the rear member 590 of the second housing structure 520. The first audio input device 611 and the second audio input device 612 can be disposed towards a side surface of the second housing structure 520 (e.g., a side surface of the electronic device). The first audio input device 611 and the second audio input device 612 can be disposed in mutually opposite directions in the side surface of the second housing structure 520. The first audio input device 611 and the second audio input device 612 can receive audios of left/right or up/down of the electronic device 10.

According to an embodiment, the third audio input device 613 can be disposed in the housing structure mutually different from that of the fourth audio input device 614. For example, the third audio input device 613 can be disposed in the second rear surface 592 of the second housing structure 520, and the fourth audio input device 614 can be disposed in the first rear surface 582 of the first housing. In a state where the electronic device 10 is in the flat state, the third audio input device 613 and the fourth audio input device 614 can be disposed in the mutually same direction (for example, a direction in which the first rear surface 582 or the second rear surface 592 is oriented). According to an embodiment, when the electronic device is in the folded state, the third audio input device 613 and the fourth audio input device 614 can face each other while being oriented in opposite directions.

The electronic device 10 can include the first audio input device 611, the second audio input device 612, and the third audio input device 613 in a surface where a rear camera (or a main camera) is formed. A camera-oriented audio capture function can be presented because the first audio input device 611, the second audio input device 612, and the third audio input device 613 are formed in a direction where the rear camera is located. The electronic device can present an audio zoom function, or an audio focus function of increasing directivity by an audio of a predetermined direction, in consideration of a difference of time at which audios reach through the plurality of audio input devices 611, 612, 613, and 614.

FIG. 6A, 6B, 6C or 6D is a diagram illustrating a location of a microphone disposed in an electronic device according to various example embodiments.

Figure 6A:
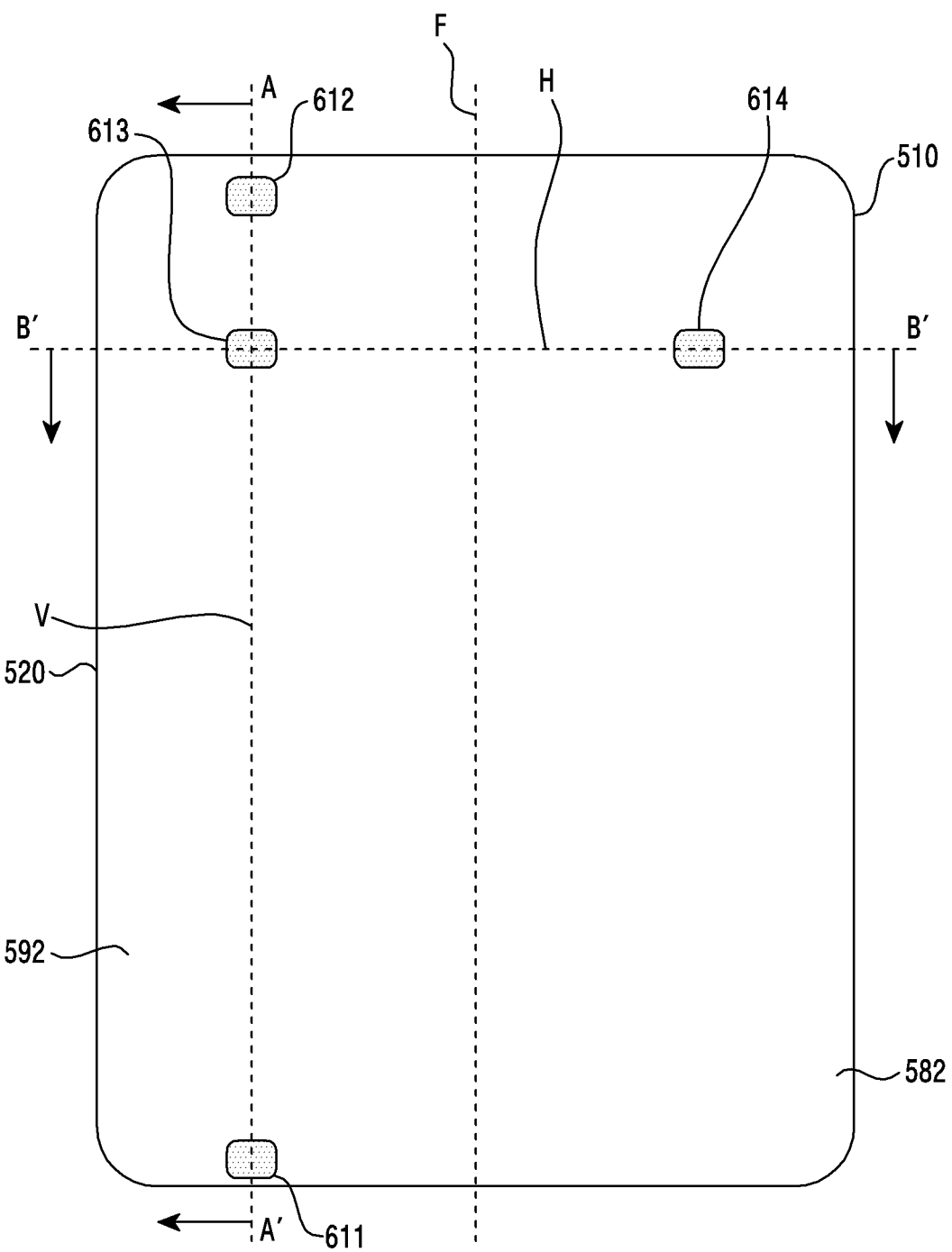
FIG. 6A is a diagram illustrating a location of a microphone disposed in an electronic device according to an example embodiment.

Referring to FIG. 6A, the first audio input device 611, the second audio input device 612 and the third audio input device 613 can be disposed in the second rear surface 592 of the second housing structure 520, and the fourth audio input device 614 can be disposed in the first rear surface 582 of the first housing structure 510.

According to an embodiment, the first audio input device 611, the second audio input device 612, and the third audio input device 613 can be aligned to a straight line (V) which is formed in a vertical direction of the electronic device parallel to a folding line (F). The first audio input device 611 and the second audio input device 612 can be disposed in a periphery of the second rear surface 592 of the second housing structure 520.

According to an embodiment, when the first audio input device 611, the second audio input device 612, and the third audio input device 613 are aligned, the audio performance of the electronic device (e.g., the electronic device 10 of FIG. 2) can be more improved than when the third audio input device 613 is shifted closer to the folding line. For example, the first audio input device 611, the second audio input device 612, and the third audio input device 613 can be spaced a predetermined distance apart in the same direction with a criterion of the folding line (F) and be disposed. In response to the first audio input device 611, the second audio input device 612, and the third audio input device 613 being aligned, when the electronic device is disposed in a portrait mode (for example, the first audio input device 611, the second audio input device 612, and the third audio input device 613 are disposed in a direction vertical to the ground), the performance of recognition of an audio of an up/down direction can be improved.

According to an embodiment, the third audio input device 613 and the fourth audio input device 614 can be aligned to a straight line (H) which is formed in a horizontal direction of the electronic device 10 vertical to the folding line.

The first audio input device 611 and the second audio input device 612 can chiefly receive an audio of an up/down direction (e.g., a vertical direction of the electronic device), and the third audio input device 613 and the fourth audio input device 614 can chiefly receive an audio of a left/right direction (e.g., a horizontal direction of the electronic device).

According to an example embodiment, the electronic device can be an in-folding type. In response to the electronic device being in the flat state, the processor (e.g., at least the processor 120 of FIG. 1) can activate the first audio input device 611, the second audio input device 612, the third audio input device 613, and the fourth audio input device 614. According to an embodiment, in response to the electronic device being in the portrait mode (for example, in response to a long edge of the electronic device being disposed vertically with a criterion of the ground), the first audio input device 611 and the second audio input device 612 can receive an audio of an up/down direction of the electronic device, and the third audio input device 613 and the fourth audio input device 614 can receive an audio of a left/right direction of the electronic device. According to an embodiment, the processor 120 can change an audio beam pattern dependent on a movement of a left/right direction of a talker (for example, a horizontal direction of the electronic device), via/using the third audio input device 613 and the fourth audio input device 614. For example, at least the processor 120 can determine the direction of the talker on the basis of a difference value of time of an audio reaching the third audio input device 613 and the fourth audio input device 614, and can form audio beamforming according to the direction of the talker.

For example, the processor 120 can adjust a beam direction of the third audio input device 613 or the fourth audio input device 614, into the direction of the talker, on the basis of the acquired difference value. Also, the processor 120 can adjust a beam gain of the third audio input device 613 or the fourth audio input device 614 according to a degree of adjacency to the talker, and can adjust beam coverage in order to enhance directivity towards the talker.

According to an example embodiment, in response to the electronic device being in a landscape mode (for example, in response to the long edge of the electronic device being disposed horizontally with a criterion of the ground), the first audio input device 611 and the second audio input device 612 can receive an audio of a left/right direction of the electronic device, and the third audio input device 613 and the fourth audio input device 614 can receive an audio of an up/down direction of the electronic device. According to an embodiment, the processor 120 can change audio beamforming dependent on a movement of a left/right direction of the talker (for example, a horizontal direction of the electronic device), via/using the first audio input device 611 and the second audio input device 612. For example, the processor 120 can determine the direction of the talker on the basis of a difference value of time of an audio reaching the first audio input device 611 and the second audio input device 612, and can form audio beamforming according to the direction of the talker.

According to an embodiment, the electronic device can be disposed wherein the folding line and an edge parallel to the folding line are in parallel to the ground in the folded state. In the folding state of the electronic device, the second rear surface 592 of the electronic device can be defined as the front surface, and the first rear surface 582 can be defined as the rear surface. The processor can receive an audio of the front surface through the third audio input device 613, and can receive an audio of the rear surface through the fourth audio input device 614. The processor can receive an audio of a left/right direction of the electronic device via/using the first audio input device 611 and the second audio input device 612.

According to an example embodiment, the processor 120 can change audio beamforming dependent on a movement of a left/right direction of the talker (for example, a horizontal direction of the electronic device), using the first audio input device 611 and the second audio input device 612. For example, the processor 120 can determine the direction of the talker on the basis of a difference value of time of an audio reaching the first audio input device 611 and the second audio input device 612, and can form audio beamforming according to the direction of the talker. The processor 120 can determine that the talker is in front/rear of the electronic device with a criterion of the electronic device, using the third audio input device 613 and the fourth audio input device 614.

Figure 6B:
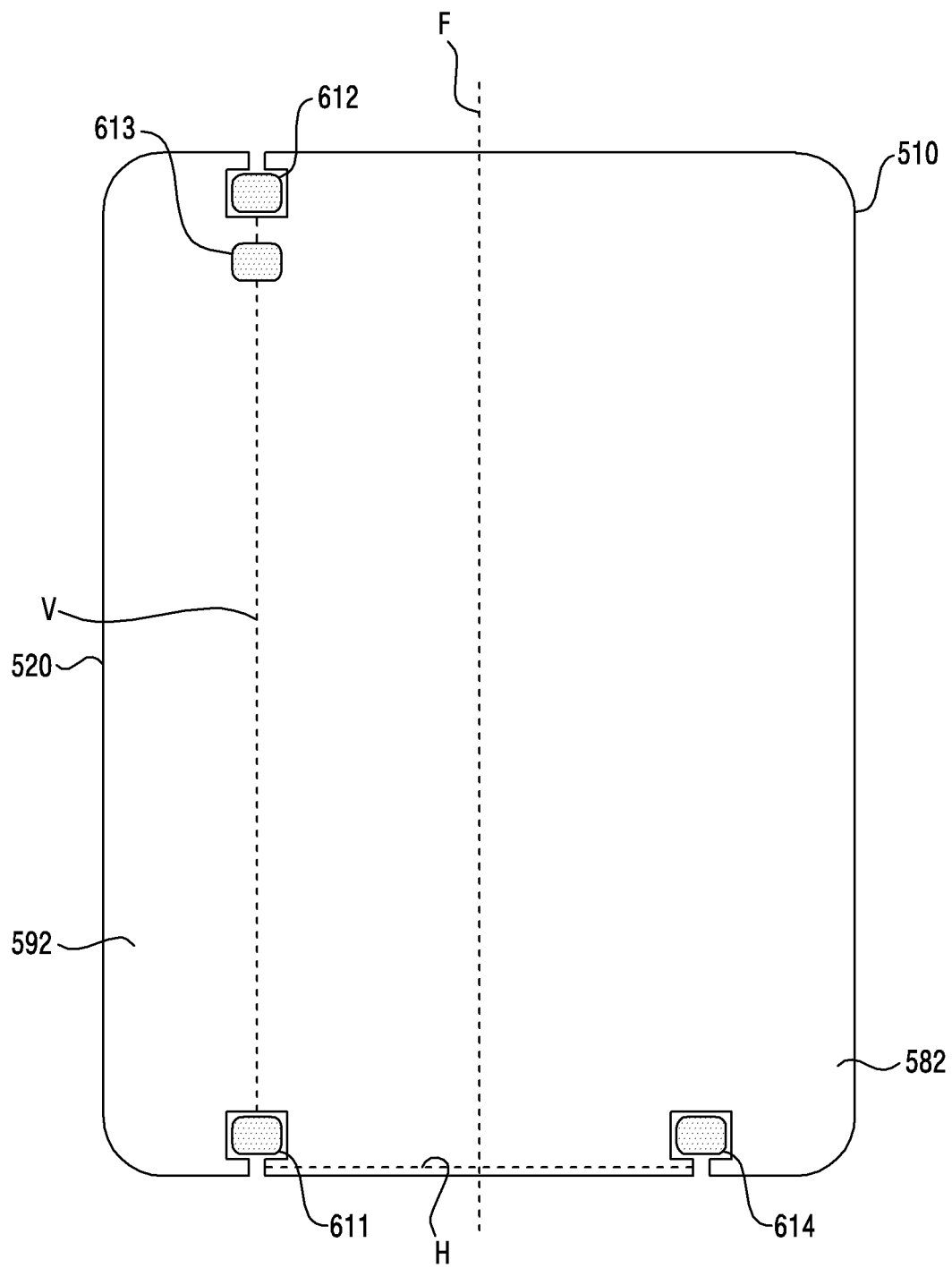
FIG. 6B is a diagram illustrating a location of a microphone disposed in an electronic device according to an example embodiment.

Referring to FIG. 6B, the first audio input device 611 and the fourth audio input device 614 can be aligned to a straight line (H) which is formed in a horizontal direction of the electronic device 10. According to an embodiment, the first audio input device 611 can be formed in adjacent to one periphery of the second housing structure 520, and the one periphery of the second housing structure 520 can be vertical to the folding line (F). The fourth audio input device 614 can be disposed in a periphery of the first housing structure 510 which extends from the one periphery of the second housing structure 520. The first audio input device 611, the second audio input device 612, and the third audio input device 613 can be used to distinguish an audio of a vertical direction of the electronic device and acquire audio information. The first audio input device 611 and the fourth audio input device 614 can be used to distinguish an audio of a horizontal direction of the electronic device and acquire audio information.

According to an embodiment, in an in-folding type electronic device, in response to the electronic device being folded, the third audio input device 613 can be identified externally, and the third audio input device 613 can receive a voice in a direction in which the rear surface 592 of the second housing structure 520 is located. In an out-folding type electronic device, in response to the electronic device being folded, the third audio input device 613 is not exposed to the external, and the third audio input device 613 can be deteriorated in its voice reception performance in a direction in which a display of the electronic device is located. The electronic device can compensate the coverage of the third audio input device 613 by a change of audio beamforming of the first audio input device 611 and the second audio input device 612.

According to an embodiment, the processor 120 can inactivate the third audio input device 613, and can change a beam pattern using at least one of the first audio input device 611, the second audio input device 612, or the fourth audio input device 614.

According to an embodiment, for the sake of direction and gain adjustment of an audio beam, the processor 120 can change a pattern of at least one beam formed using the first audio input device 611, the second audio input device 612, or the fourth audio input device 614. According to an embodiment, the processor 120 can change a beam pattern of the second audio input device 612 disposed in adjacent to the third audio input device 613, to adjust a gain and direction of a beam formed by the third audio input device 613.

According to an embodiment, the change of the beam pattern can change at least one of a phase or gain of at least one beam formed using the first audio input device 611, the second audio input device 612, or the fourth audio input device 614. For example, a phase of the second audio input device 612 can be changed to orient the rear surface 592 of the second housing 520, or a gain of a beam of a rear direction of the second housing 520 can be changed.

Figure 6C:
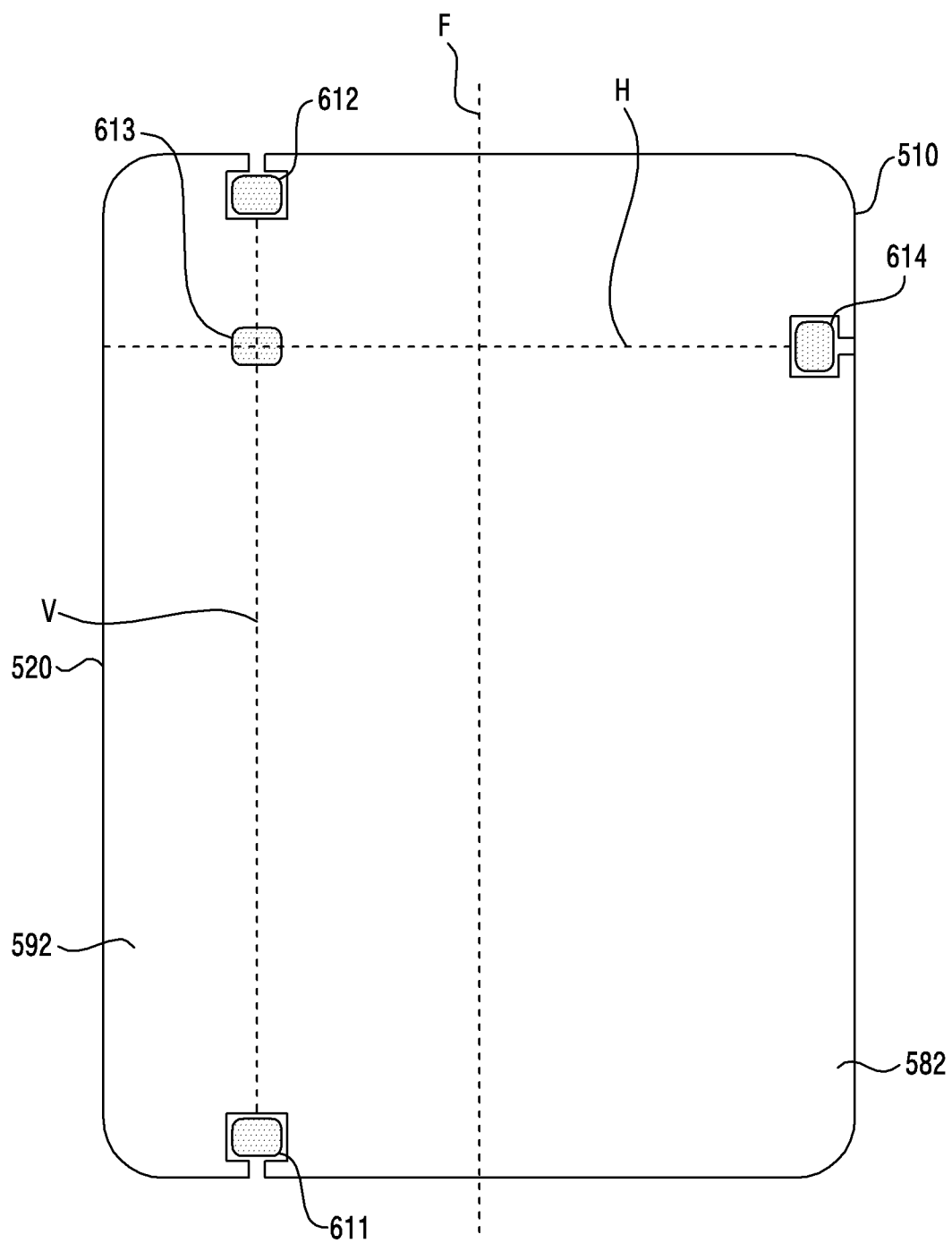
FIG. 6C is a diagram illustrating a location of a microphone disposed in an electronic device according to an example embodiment.

Referring to FIG. 6C, the third audio input device 613 and the fourth audio input device 614 can be aligned to a straight line (H) which is formed in a vertical direction to the folding line (F) of the electronic device 10. The fourth audio input device 614 can be disposed in a periphery parallel to the folding line (F) of the first housing structure 510. For example, the fourth audio input device 614 can be disposed to orient a side surface at a periphery of the first housing structure 510. According to an embodiment, in response to the out-folding type electronic device being folded along the folding line, the first rear surface 582 of the first housing structure 510 can mutually face the second rear surface 592 of the second housing structure 520. The performance of the third audio input device 613 can be deteriorated because the third audio input device 613 faces the first rear surface 582. Because the fourth audio input device 614 is disposed towards the side surface, the fourth audio input device 614 does not face the second rear surface 592 of the second housing 520 even in the folded state and thus, compensate the performance of the third audio input device 613.

Figure 6D:
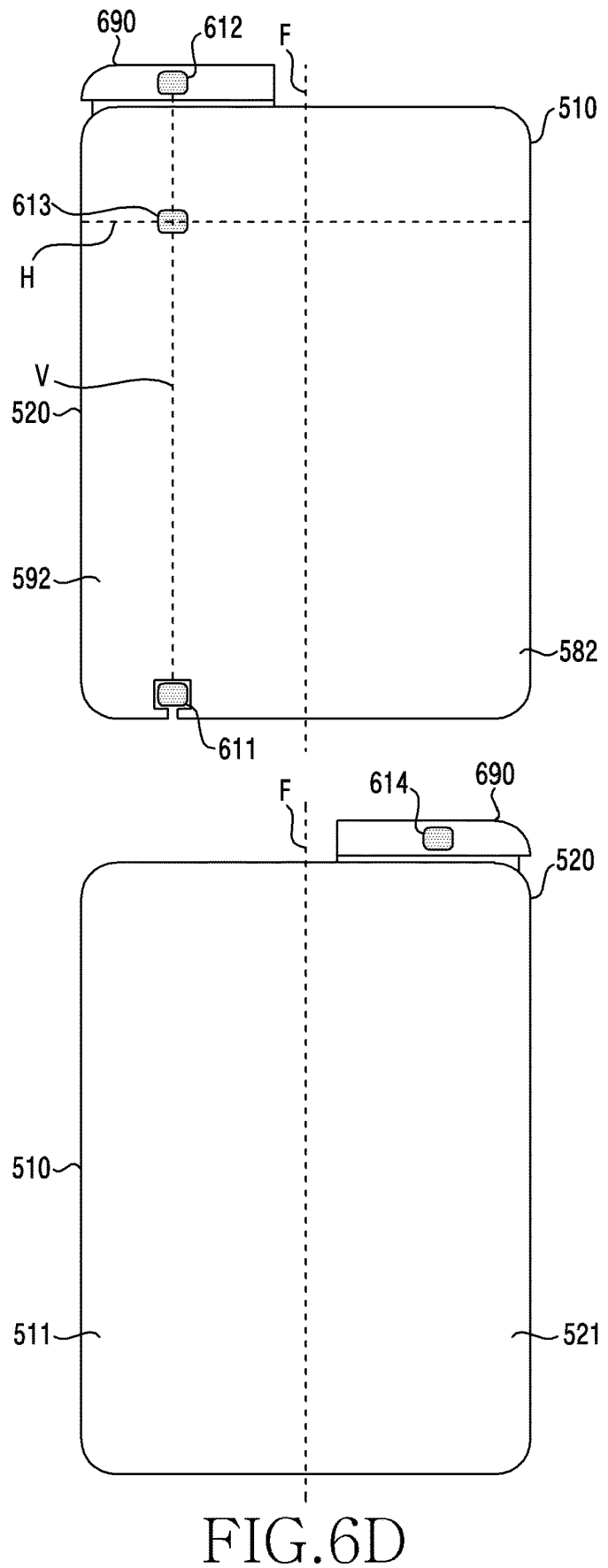
FIG. 6D is a diagram illustrating a location of a microphone disposed in an electronic device according to an example embodiment.

Referring to FIG. 6D, the electronic device can include a sliding module 690 which may comprise a housing. The sliding module 690 can include the second audio input device 612 and the fourth audio input device 614 in one surface. The second audio input device 612 can be disposed in a direction in which the third audio input device 613 is oriented (for example, a direction of orienting the rear surface 592 of the second housing structure 520), and the fourth audio input device 614 can be disposed in a direction of orienting the front surface 521 of the second housing structure 520.

According to an embodiment, in the out-folding type, although the third audio input device 613 faces the rear surface 582 of the first housing structure 510, the second audio input device 612 can replace a function of the third audio input device 613. For example, in response to the performance of the third audio input device 613 being deteriorated, the processor can compensate the coverage of the third audio input device 613 using the second audio input device 612.

According to an, the third audio input device 613 can be disposed towards a side surface located in a periphery parallel to the folding line (F) among peripheries of the second housing structure 520. When the third audio input device 613 is exposed to the side surface, the out-folding type can maintain a quad microphone structure without inactivating of the third audio input device 613.

The electronic device of FIGS. 6A, 6B, 6C and FIG. 6D can acquire the audio information of the horizontal direction and the audio information of the vertical direction, to perform stereoscopic audio capture. The electronic device can present a 360-degree or surround audio capture function.

Figure 7:
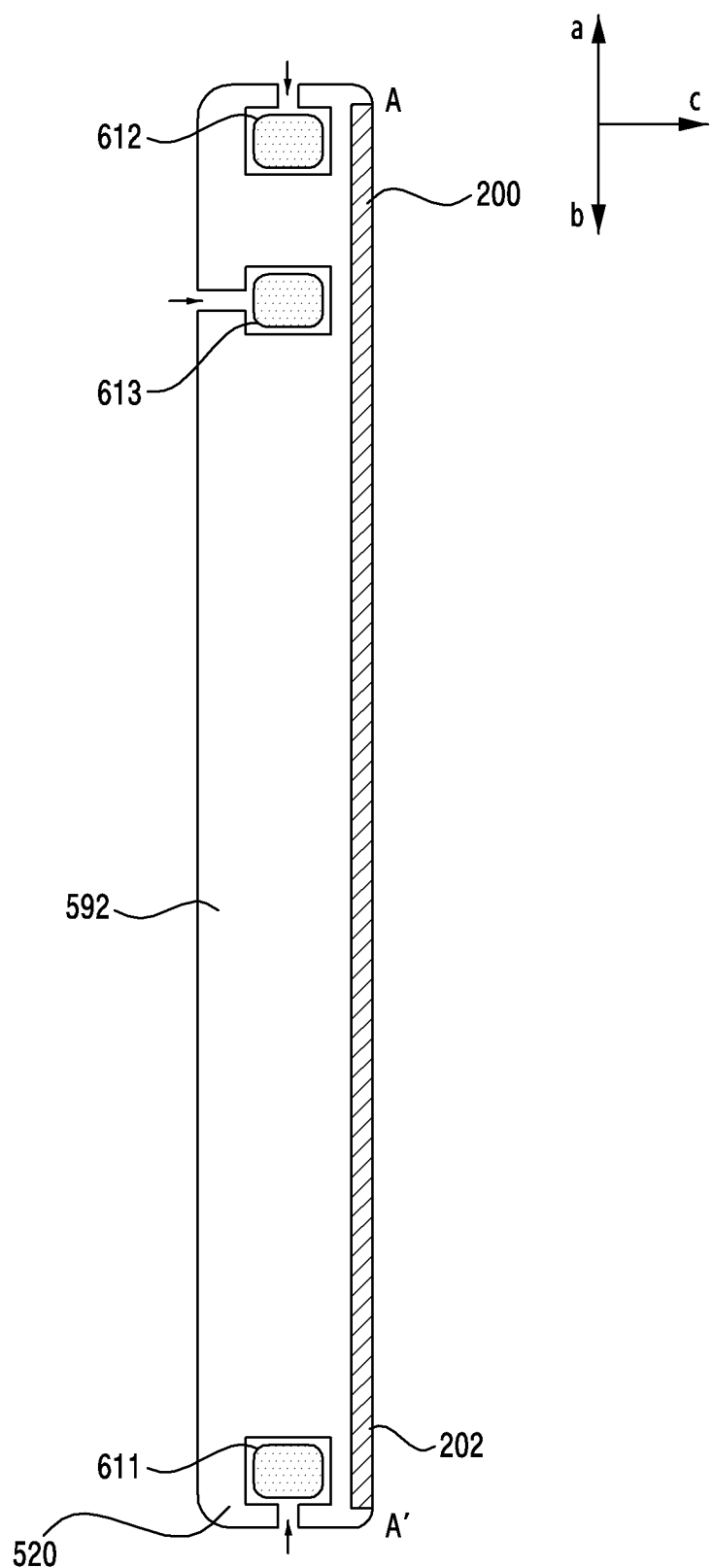
FIG. 7 is a cross section taken along line A-A' of the electronic device of FIG. 6A.

FIG. 7 is a cross section taken along line A-A' of the electronic device of FIG. 6A.

Referring to FIG. 7, the second housing structure 520 of the electronic device 10 can include the first audio input device 611, the second audio input device 612, and the third audio input device 613. The first audio input device 611, the second audio input device 612, and the third audio input device 613 can be disposed in the second rear surface 592 opposite to a surface where the display 200 is disposed.

According to an example embodiment, a rear camera can be disposed in the second rear surface 592 of the second housing structure 520, and can present a camera-oriented stereo capture function through the first audio input device 611, the second audio input device 612, and the third audio input device 613. The first audio input device 611 can acquire voice data going along a direction (a), and the third audio input device 613 can acquire voice data going along a direction (b). The second audio input device 612 disposed in the second rear surface 592 can acquire voice data proceeding along a direction (c) which is vertical to the direction (a) or the direction (b). On the basis of a difference of time of an audio reaching each of the first audio input device 611, the second audio input device 612, and the third audio input device 613 or a magnitude of the audio, a location of a talker can be tracked, and an audio focus function of presenting a voice according to the talker can be presented.

Figure 8A:
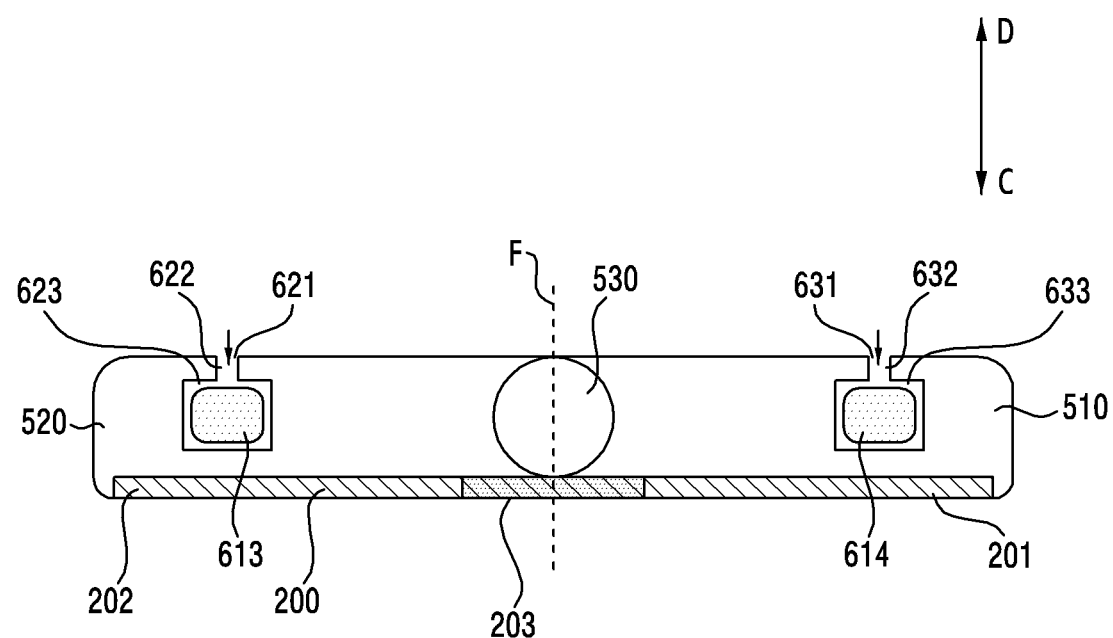
FIG. 8A is a cross section taken along line B-B' of the electronic device of FIG. 6A.
Figure 8B:
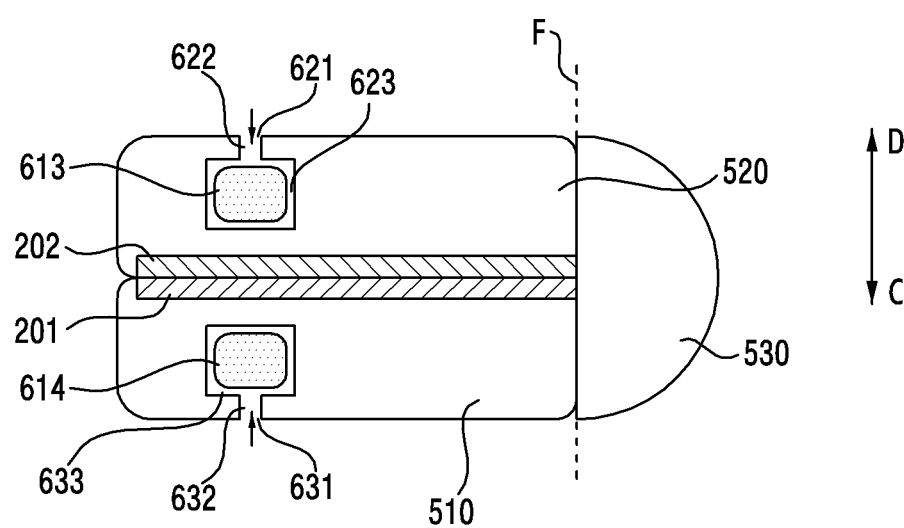
FIG. 8B is a diagram illustrating a folded state of the electronic device of FIG. 8A.

FIG. 8A is a cross section taken along line B-B' of the electronic device of FIG. 6A, and FIG. 8B illustrates a state in which the electronic device of FIG. 8A is folded.

Referring to FIG. 8A, the electronic device can include the display 200, and the third audio input device 613 and the fourth audio input device 614 disposed in a surface facing the display 200. Referring to FIG. 8B, as the first housing structure 510 and the second housing structure 520 disposed at both sides of the hinge structure 530 are folded, the first region 201 of the display 200 and the second region 202 of the display can be folded along the folding region 203 and face each other, and the third audio input device 613 and the fourth audio input device 614 can face each other.

According to an example embodiment, in the flat state, the third audio input device 613 and the fourth audio input device 614 can be located in the mutually same surface, and can be disposed to be oriented in the mutually same direction. In the flat state, the third audio input device 613 and the fourth audio input device 614 can recognize an audio introduced along a direction (c), and can identify a direction of a voice of a direction vertical to the direction (c) using a difference of time reaching each of the third audio input device 613 or the fourth audio input device 614.

According to an example embodiment, in the flat state, the third audio input device 613 and the fourth audio input device 614 can be located in mutually opposite surfaces, and can be disposed towards mutually opposite directions. The third audio input device 613 can recognize an audio introduced in the direction (c), and the fourth audio input device 614 can recognize an audio introduced in a direction (d).

According to an example embodiment, the third audio input device 613 and the fourth audio input device 614 can be disposed in the second rear surface 592 of the second housing structure 520 or the first rear surface 582 of the first housing structure 510. The second housing structure 520 can have an opening 621 formed in a surface where the third audio input device 613 is disposed, and include an audio conduit 622 extended from the opening to a housing and a safely mounting portion 623 where the third audio input device 613 is accepted. The first housing structure 510 can have an opening 631 formed in a surface where the fourth audio input device 614 is disposed, and include an audio conduit 632 extended from the opening to the housing and a safely mounting portion 633 where the fourth audio input device 614 is accepted. Thus, each of the first, second, third, and fourth audio input devices each comprise a housing opening (e.g., the opening where 613 is located), audio input circuitry, and the audio conduit (e.g., 622, 632), wherein the audio conduit is defined in the housing and connected to the corresponding housing opening.

Figure 9:
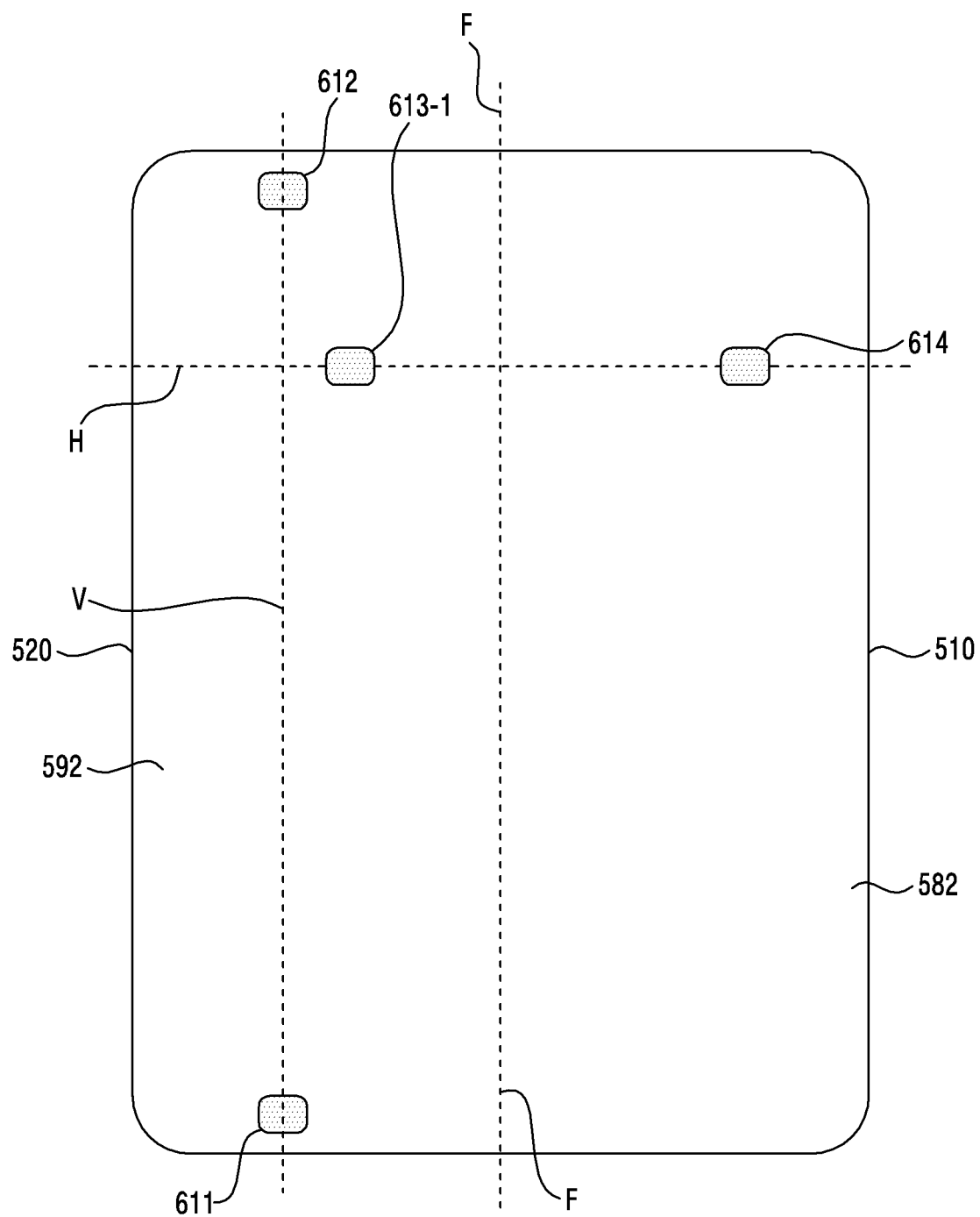
FIG. 9 is a diagram illustrating various disposition of a microphone of an electronic device according to an example embodiment.
Figure 10:
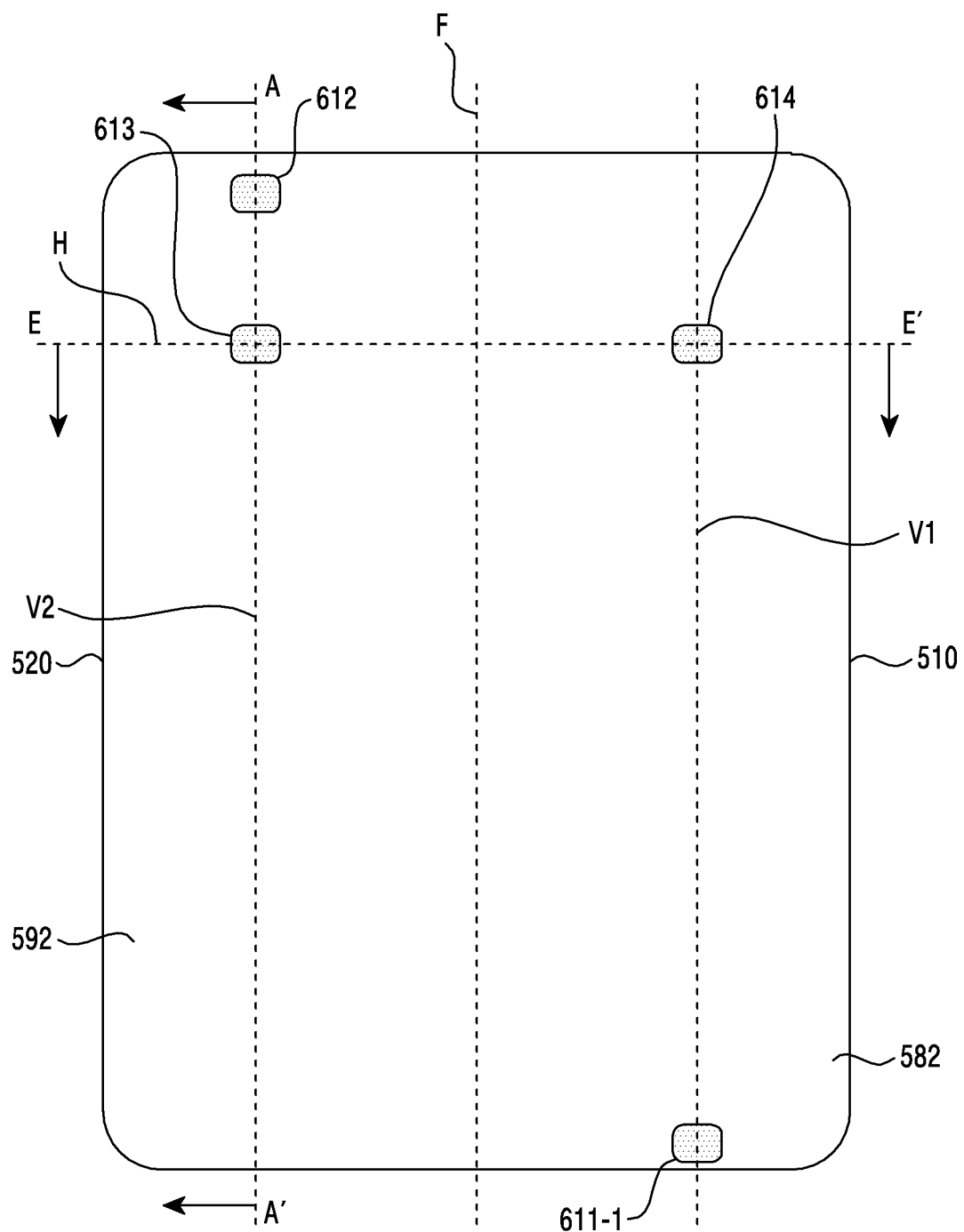
FIG. 10 is a diagram illustrating various disposition of a microphone of an electronic device according to an example embodiment.

FIGS. 9 and 10 are diagrams illustrating various disposition of a microphone of an electronic device according to an example embodiment.

The electronic device of an embodiment can variously form a location of an audio input device set.

Referring to FIG. 9, the first audio input device 611 and the second audio input device 612 can be disposed in alignment with a straight line (V) parallel to the folding line, and a third audio input device 613-1 and the fourth audio input device 614 can be disposed in alignment with a straight line (H) vertical to the folding line (F).

According to an example embodiment, the third audio input device 613-1 may not be aligned to the straight line (V) parallel to the folding line (F), but can be disposed in adjacent to the straight line (V) where the first audio input device 611 and the second audio input device 612 are disposed. According to an embodiment, the third audio input device 613-1 and the fourth audio input device 614 can be used to determine a location of a voice which is provided in the front surface or the rear surface of the electronic device. The third audio input device 613-1 and the fourth audio input device 614 can recognize a location of a talker who moves vertically with a criterion of the folding line. For example, the third audio input device 613-1 and the fourth audio input device 614 can recognize the location of the talker who moves from the third audio input device 613-1 to the fourth audio input device 614.

According to an embodiment, the electronic device can be an in-folding type or an out-folding type. In response to the electronic device being in the flat state, the processor (e.g., the processor 120 of FIG. 1) can activate the first audio input device 611, the second audio input device 612, the third audio input device 613-1, and the fourth audio input device 614. According to an embodiment, in response to the electronic device being in the portrait mode (for example, in response to the long edge of the electronic device being disposed vertically with a criterion of the ground), the first audio input device 611 and the second audio input device 612 can receive an audio of an up/down direction of the electronic device, and the third audio input device 613-1 and the fourth audio input device 614 can receive an audio of a left/right direction of the electronic device. According to an embodiment, the processor 120 can change audio beamforming dependent on a movement of a left/right direction of the talker (for example, a horizontal direction of the electronic device), using the third audio input device 613-1 and the fourth audio input device 614. For example, the processor 120 can determine the direction of the talker on the basis of a difference of time of an audio reaching the third audio input device 613-1 and the fourth audio input device 614, and can form audio beamforming according to the direction of the talker.

According to an embodiment, in response to the electronic device being in the landscape mode (for example, in response to the long edge of the electronic device being disposed horizontally with a criterion of the ground), the first audio input device 611 and the second audio input device 612 can receive an audio of a left/right direction of the electronic device, and the third audio input device 613-1 and the fourth audio input device 614 can receive an audio of an up/down direction of the electronic device. According to an embodiment, the processor 120 can change audio beamforming dependent on a movement of a left/right direction of the talker (for example, a horizontal direction of the electronic device), using the first audio input device 611 and the second audio input device 612. For example, the processor 120 can determine the direction of the talker on the basis of a difference value of time of an audio reaching the first audio input device 611 and the second audio input device 612, and can form audio beamforming according to the direction of the talker.

According to an embodiment, the electronic device can be disposed wherein the folding line and a periphery parallel to the folding line are in parallel to the ground in the folded state. In the folding state of the electronic device, the second rear surface 592 of the electronic device can be defined as the front surface, and the first rear surface 582 can be defined as the rear surface. The processor can receive an audio of the front surface through the third audio input device 613-1, and can receive an audio of the rear surface through the fourth audio input device 614. The processor can receive an audio of a left/right direction of the electronic device using the first audio input device 611 and the second audio input device 612.

According to an embodiment, the processor 120 can change audio beamforming dependent on a movement of a left/right direction of the talker (for example, a horizontal direction of the electronic device), using the first audio input device 611 and the second audio input device 612. For example, the processor 120 can determine the direction of the talker on the basis of a difference value of time of an audio reaching the first audio input device 611 and the second audio input device 612, and can form audio beamforming according to the direction of the talker. The processor 120 can determine that the talker is in front/rear of the electronic device with a criterion of the electronic device, using the third audio input device 613-1 and the fourth audio input device 614.

Referring to FIG. 10, a first audio input device 611-1 and the fourth audio input device 614 can be disposed in alignment with a straight line (V1) parallel to the folding line, and the second audio input device 612 and the third audio input device 613 can be disposed in alignment with a straight line (V2) parallel to the folding line (F).

The third audio input device 613 and the fourth audio input device 614 can be disposed in alignment with a straight line (H) vertical to the folding line (F).

According to an example embodiment, the third audio input device 613 can be aligned to the straight line (V2) parallel to the folding line (F). For example, the third audio input device 613 can be formed at a predetermined distance from the second audio input device 612 in the same direction as the folding line (F). The first audio input device 611-1 can be aligned to the straight line (V1) parallel to the folding line (F). The fourth audio input device 614 can be formed at a predetermined distance from the first audio input device 611-1 in the same direction as the folding line (F).

In response to the electronic device being in the portrait mode (or a character mode), the first audio input device 611-1 and the second audio input device 612 can be used to determine a location of a voice which is provided in an up/down direction of the electronic device. Although the first audio input device 611-1 and the second audio input device 612 are not aligned to the same straight line, because a mutually spaced distance is enough, a difference of time of arrival of a voice provided in the up/down direction of the electronic device can be enough.

According to an example embodiment, in response to the electronic device being in the landscape mode, the first audio input device 611-1 and the second audio input device 612 can be used to determine a location of a voice which is provided in a left/right direction of the electronic device.

According to an example embodiment, in response to being in the portrait mode, the third audio input device 613 and the fourth audio input device 614 can be used to determine a location of a voice which is provided in a left/right direction of the electronic device, and can recognize a location of the talker who moves in the left/right direction with a criterion of the electronic device. According to an embodiment, in response to the electronic device being in the landscape mode, the third audio input device 613 and the fourth audio input device 614 can be used to determine a location of a voice which is provided in an up/down direction of the electronic device.

According to an example embodiment, in response to the electronic device being mounted in the folded state, the first audio input device 611-1 and the second audio input device 612 recognize an audio provided in a left/right direction of the electronic device, and can recognize a location of the talker who moves in the left/right direction with a criterion of the electronic device. The third audio input device 613 and the fourth audio input device 614 can recognize an audio which is provided in front/rear of the electronic device.

Figure 11:
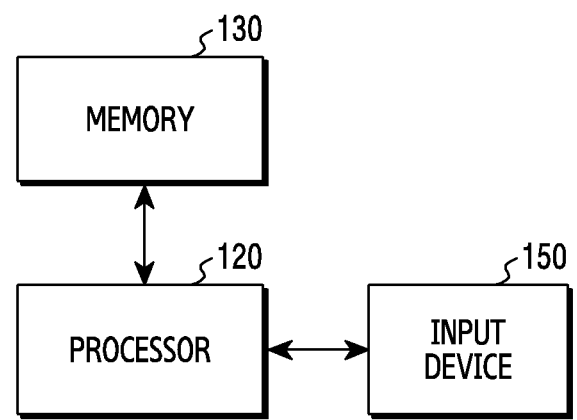
FIG. 11 is a block diagram of an electronic device according to an example embodiment.
Figure 12:
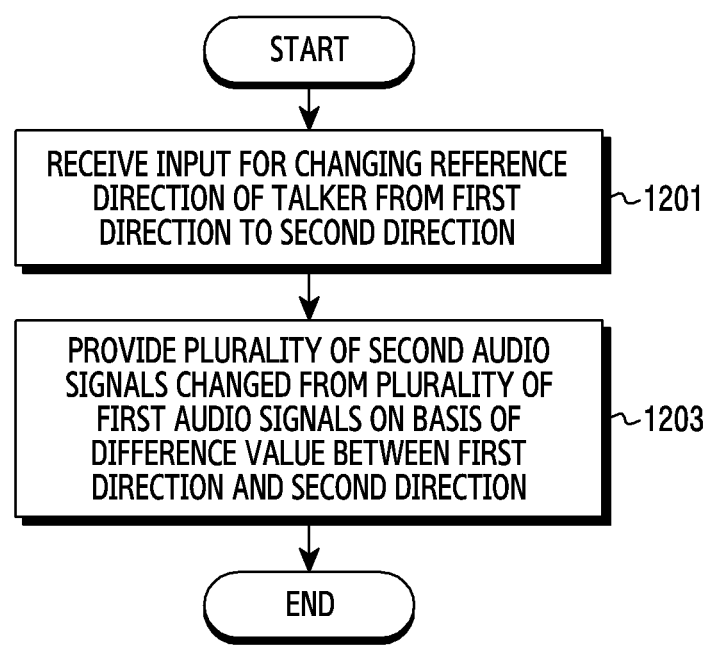
FIG. 12 is a diagram illustrating an example of an operation of a device processing a voice signal of an electronic device according to an example embodiment.
Figure 13:
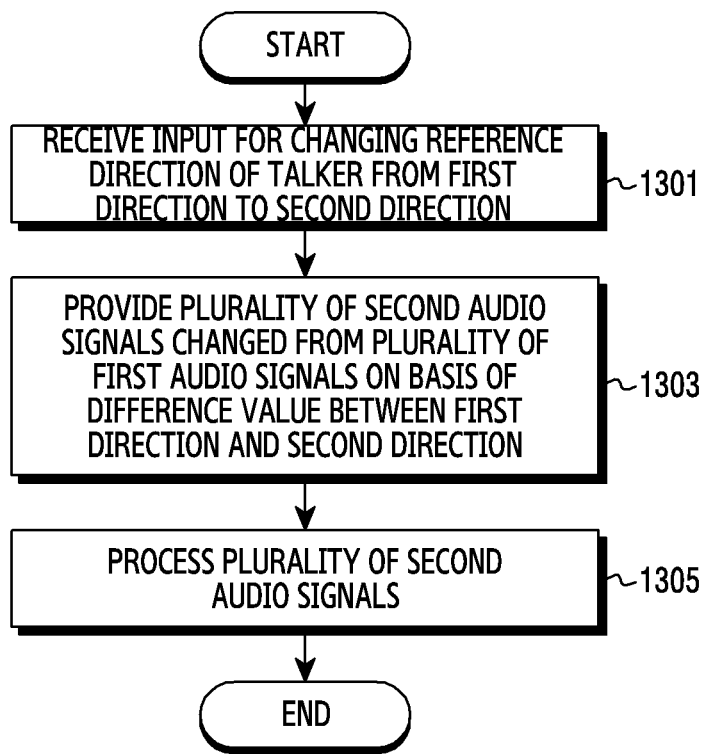
FIG. 13 is a diagram illustrating an example of an operation of an electronic device providing a plurality of second audio signals according to an example embodiment.

FIG. 11 is a block diagram of an electronic device according to an example embodiment. FIG. 12 illustrates an example of an operation of a device processing a voice signal of the electronic device according to an example embodiment. FIG. 13 illustrates an example of an operation of the electronic device providing a plurality of second audio signals according to an example embodiment.

Referring to FIG. 11, the electronic device can be an electronic device capable of receiving a 360-degree-oriented audio signal. In the folding state, the electronic device can receive an audio signal through the input device 150 disposed in a front surface, a rear surface or a left/right side surface of the electronic device. According to an embodiment, in the flat state, the electronic device 101 can receive an audio signal forwarded from the front surface of the electronic device, through upper and lower speakers disposed in the front surface of the electronic device or left/right side speakers. The electronic device 101 can include at least one of the processor 120, the memory 130 or the input device 150. According to an embodiment, the input device 150 can include the first audio input device 611, the second audio input device 612, the third audio input device 613, and the fourth audio input device 614 of FIG. 5.

The processor 120 can be operatively connected with the memory 130 and the input device 150. The processor 120 can control the memory 130 and the input device 150 through the connection.

In an embodiment, the processor 120 can obtain an input for changing a reference direction of a 360-degree audio through the input device 150, by executing a plurality of instructions stored in the memory 130. The input device 150 can include a camera 571, the first audio input device 611, the second audio input device 612, the third audio input device 613, and the fourth audio input device 614. The processor 120 can obtain an input for changing the reference direction of the 360-degree audio from a first direction to a second direction. In an embodiment, in response to obtaining (or receiving) the input, the processor 120 can identify a plurality of first audio signals for the 360-degree audio by executing the plurality of instructions stored in the memory 130. The plurality of audio signals can be acquired through the input device 150 while an image of a front direction acquired through the camera is acquired. The processor 120 can confirm the received image of the front direction and the plurality of first audio signals. The plurality of first audio signals each can be received from the first audio input device 611, the second audio input device 612, the third audio input device 613, and the fourth audio input device 614. The plurality of first audio signals each can be received through the first audio input device 611, the second audio input device 612, the third audio input device 613, and the fourth audio input device 614 capable of adaptively changing a gain (or a recording mode) according to the reference direction.

In an example embodiment, in response to obtaining (or receiving) the input, the processor 120 can determine a difference value between the first direction and the second direction, by executing the plurality of instructions stored in the memory 130. The difference value can be used to adjust the plurality of first audio signals according to the change of the reference direction (for example, a change of a location of a talker). The difference value can be used to provide a plurality of second audio signals changed from the plurality of first audio signals. For example, the plurality of second audio signals each can construct a plurality of channel audio data. For example, the plurality of second audio signals each can be outputted through each of a plurality of channels. The difference value can be determined based on a location relationship between the first direction and the second direction. The difference value can be comprised of one or more of a parameter indicating an angle or a parameter indicating a direction. In various embodiments, information on the difference value can be acquired together with the plurality of first audio signals.

In an example embodiment, the processor 120 can provide the plurality of second audio signals changed from the plurality of first audio signals on the basis of the determined difference value, by executing the plurality of instructions stored in the memory 130. The plurality of second audio signals can be audio signals corresponding to a direction image in which a camera module is oriented, acquired through the camera module which has the second direction as the reference direction. The plurality of second audio signals each can be related to each of a plurality of channels for the sake of a surround effect. Referring to FIG. 12, in operation 1201, the processor 120 can receive an input for changing the reference direction of the talker from the first direction to the second direction. The reference direction can be a front surface of the electronic device at a time point when recording is initiated using the input device 150. The reference direction can be determined about matching or non-matching on the basis of audio signals acquired through the first audio input device 611, the second audio input device 612, the third audio input device 613, and the fourth audio input device 614. To solve the non-matching, the change of the reference direction can be required for the electronic device. For example, whether the reference direction of the talker is matched with the set first direction can be determined on the basis of the audio signals acquired through the first audio input device 611, the second audio input device 612, the third audio input device 613, and the fourth audio input device 614. In response to recognizing that the reference direction of the talker is matched with the first direction, the processor 120 can set a direction in which one surface of the electronic device is oriented, as the reference direction the first direction. In response to the talker moving in a direction of orienting the second audio input device 612, the processor 120 can sense a variation of audio signals (for example, a time difference of audio signals received by respective audio input devices or magnitudes of the audio signals, etc.), and recognize that the reference direction and the first direction are non-matched.

In operation 1203, the processor 120 can provide a plurality of second audio signals changed from a plurality of first audio signals, on the basis of a difference value between the first direction and the second direction. The processor 120 can determine at least one audio signal among the plurality of first audio signals which will be allocated for each of the plurality of second audio signals on the basis of the difference value. The processor 120 can apply a weight corresponding to each of the plurality of second audio signals, to at least a portion of the determined at least one audio signal, thereby providing the plurality of second audio signals. The plurality of second audio signals can be constructed to be outputted in the second direction being the reference direction.

Referring to FIG. 13, operations 1301 to 1305 can correspond to operations 1201 to 1203 of FIG. 12.

In operation 1301, the processor 120 can allocate at least one audio signal among a plurality of first audio signals to each of a plurality of second signals, on the basis of a difference value. For example, a combination of the plurality of first audio signals for the plurality of second audio signals which will be provided can be determined on the basis of the difference value.

In operation 1303, the processor 120 can apply a weight to each of the at least one audio signal, to provide each of the plurality of second audio signals. The processor 120 can apply a delay changed in accordance with a changed direction, to the at least one audio signal, to provide the plurality of second audio signals.

In operation 1305, the processor 120 can process the plurality of second audio signals. To provide a 360-degree audio, the processor 120 can output each of the plurality of second audio signals through an output device corresponding to each of a plurality of channels. For example, the processor 120 can store the plurality of second audio signals for the sake of playback of the 360-degree audio.

According to various embodiments, the electronic device can acquire a plurality of audios through the first audio input device 611, the second audio input device 612, the third audio input device 613, and the fourth audio input device 614. The reference direction can be changed according to a location of a talker, and talker tracking recording can be achieved through post processing of an audio signal according to the changed reference direction.

Figure 14A:
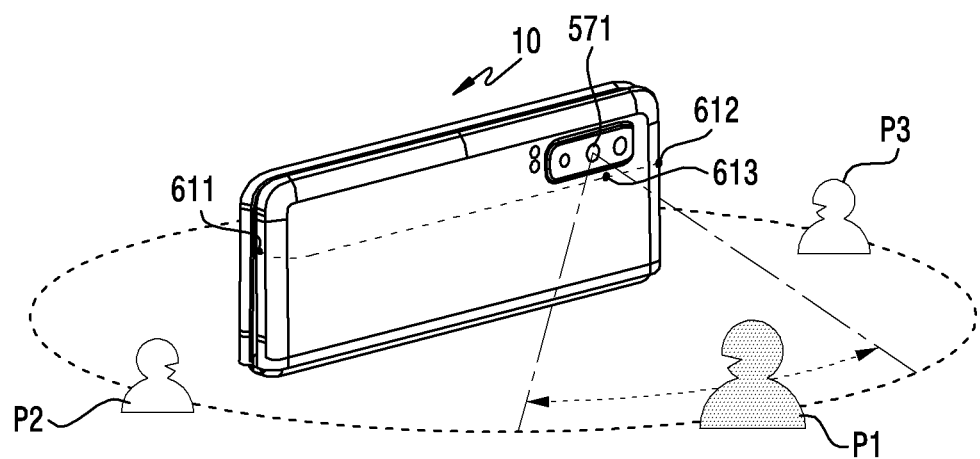
FIG. 14A is a diagram illustrating image and audio capture in a folding state of an electronic device according to an example embodiment.
Figure 14B:
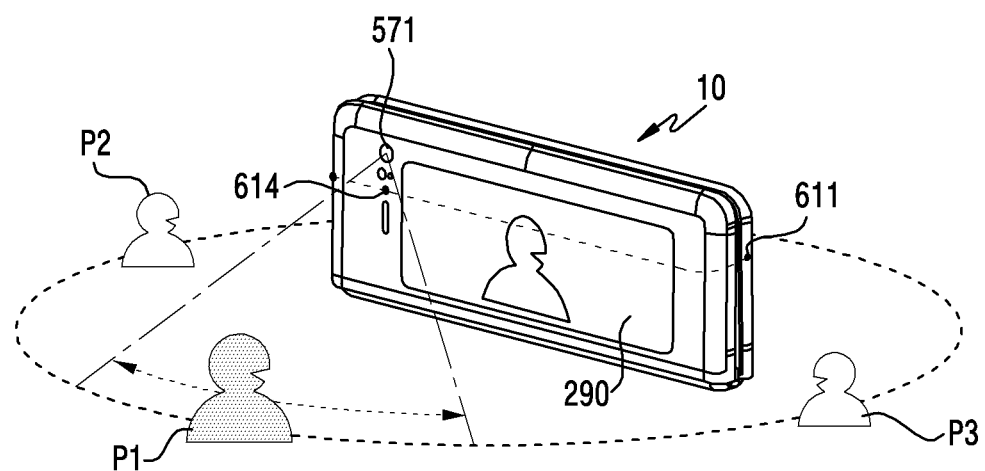
FIG. 14B is a diagram illustrating image and audio capture in a folding state of an electronic device according to an example embodiment.

FIGS. 14A and 14B are diagrams illustrating image and audio capture in a folded state of an electronic device according to various example embodiments.

Referring to FIG. 14A, to perform a directive audio capture function, the camera 571 of the electronic device can use the first audio input device 611, the second audio input device 612, and the third audio input device 613 of the electronic device of the folded state. Because the third audio input device 613 is disposed in the rear surface of the electronic device 10 where the camera 571 is disposed, the third audio input device 613 can acquire a voice of a talker (P1) who faces the camera. The first audio input device 611 can acquire a voice of a talker (P2) who is located on the left side of the electronic device 10. According to an embodiment, in response to acquiring an audio (for example, a first audio signal) of the talker (P2) located on the left side using the first audio input device 611, the second audio input device 612, and the third audio input device 613, the processor 120 can change a reference direction into a P2 direction, and can provide and process a second audio signal, on the basis of the acquired audio of the talker a difference value of the reference directions, on the basis of the changed reference directions. The second audio input device 612 can acquire a voice of a talker (P3) who is located on the right side of the electronic device 10. According to an embodiment, in response to acquiring an audio (for example, a first audio signal) of the talker located on the right side using the first audio input device 611, the second audio input device 612, and the third audio input device 613, the processor 120 can change the reference direction into a P3 direction, and can provide and process the second audio signal, on the basis of the acquired audio of the talker a difference value of the reference directions, on the basis of the changed reference directions.

According to an embodiment, the first audio input device 611, the second audio input device 612, and the third audio input device 613 can present a camera-directive stereo audio capture function together an image acquired through the camera 571.

A stereo audio recorded in the first audio input device 611, the second audio input device 612, and the third audio input device 613 can be processed in consideration of a time of reaching the first audio input device 611, the second audio input device 612 and the third audio input device 613, a magnitude of an audio, etc., to present a function of audio focus and audio zoom for a specific subject within a photographed video.

According to an embodiment, in the folded state, the electronic device 10 can perform surround audio capture using the fourth audio input device 614 disposed in the rear surface of the third audio input device 613.

Referring to FIG. 14B, the fourth audio input device 614 can be disposed in a rear surface of the third audio input device 613 (for example, a surface where the second display 290 is disposed). Assuming a video call, the fourth audio input device 614, the second display 290 and the camera 571 can be oriented in the same direction.

Through the audio processing described in FIG. 14A, the fourth audio input device 614 can acquire a voice of the talker (P1), and the second audio input device 612 can acquire a voice of the talker (P2) located on the left side of the electronic device 10. The first audio input device 611 can acquire a voice of the talker (P3) located on the right side of the electronic device 10.

Figure 15A:
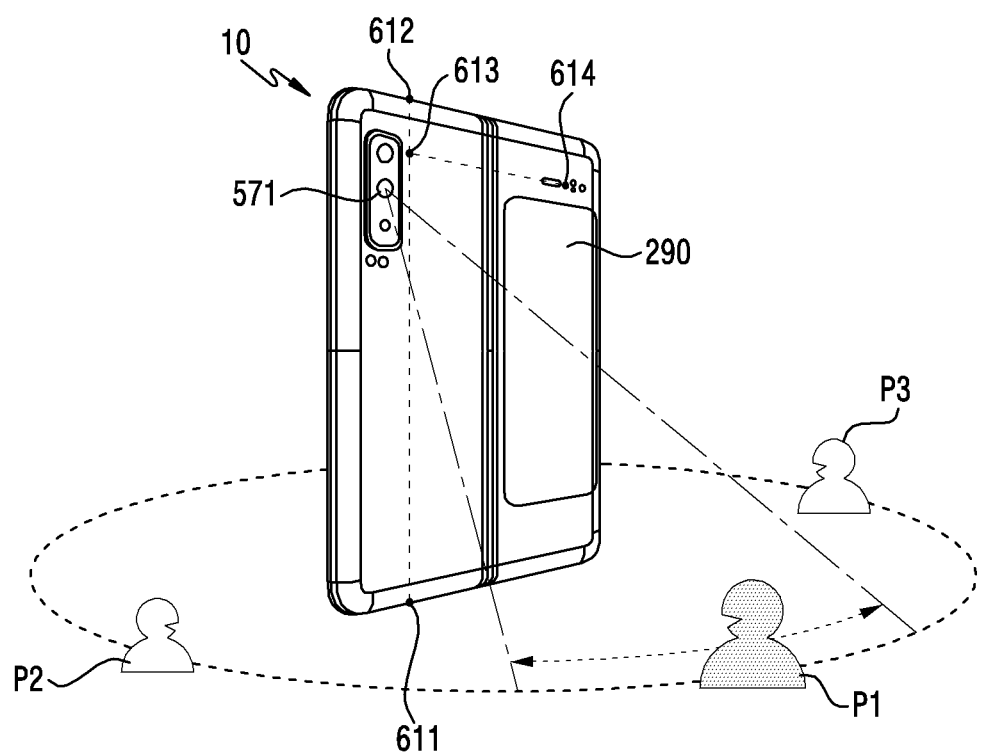
FIG. 15A is a diagram illustrating image and audio capture in an unfolding state of an electronic device according to an embodiment.
Figure 15B:
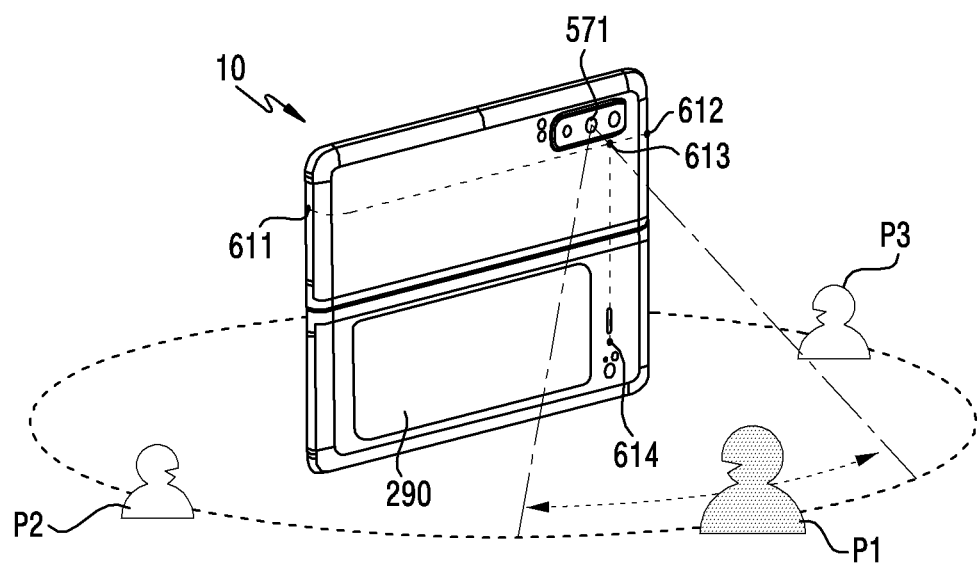
FIG. 15B is a diagram illustrating image and audio capture in an unfolding state of an electronic device according to an example embodiment.

FIG. 15A and FIG. 15B are diagrams illustrating image and audio capture in a flat state of an electronic device according to an example embodiment. FIG. 15A and FIG. 15B illustrate recording a voice by a rear camera while maintaining the electronic device in a tablet mode.

Referring to FIG. 15A, the electronic device can dispose the third audio input device 613 and the fourth audio input device 614, in a surface orienting the camera 571, and can dispose the second display 290. The second display 290 can be used when making a video call or using a video conference, etc.

The first audio input device 611 and the second audio input device can be used to distinguish a height difference of the talkers (P1, P2 and P3), and can be used to recognize the talker located in front of the camera (P1). The third audio input device 613 and the fourth audio input device 614 can be used to distinguish the talkers (P2 and P3) located towards left/right surfaces of a horizontal direction of the electronic device 10.

Referring to FIG. 15B, the electronic device can include the third audio input device 613 and the fourth audio input device 614 capable of recording a voice going in the same direction as that of a surface orienting the camera 571. The third audio input device 613 and the fourth audio input device 614 can be used to acquire an audio of the talker (P1) located in front of the camera 571, and distinguish a location of the P1. The first audio input device 611 and the second audio input device can be used to distinguish the talkers (P2 and P3) located towards the left/right surfaces of the horizontal direction of the electronic device 10.

An electronic device (e.g., the electronic device 10 of FIG. 2) of an embodiment can include a foldable housing which includes a first surface oriented in a first direction in an unfolding state, a second surface oriented in a second direction opposite to the first direction, and a side surface formed between the first surface and the second surface, the foldable housing including a hinge structure (e.g., the hinge structure 540 of FIG. 4) which can switch the foldable housing to a folding state or the unfolding state, a first housing structure (e.g., the first housing structure 510 of FIG. 4) which is connected (directly or indirectly) to the hinge structure, and includes a first side member at least partially surrounding one space between the first surface and the second surface, and a second housing structure (e.g., the second housing structure 520 of FIG. 4) which is connected (directly or indirectly) to the hinge structure, and includes a second side member at least partially surrounding the remnant space between the first surface and the second surface, and is folded with the first housing structure by pivoting about the hinge structure, wherein a second surface of the first housing structure faces a second surface of the second housing structure in a folded state, and a first display (e.g., the display 200 of FIG. 4) which is formed in at least one surface of the foldable housing and overlaps with the first housing structure and the second housing structure, and is bendable by pivoting about a hinge shaft of the hinge structure, and an audio input device set (e.g., the first audio input device 611, the second audio input device 612, the third audio input device 613 and the fourth audio input device 614 of FIG. 5) which is disposed in at least one of the first housing structure or the second housing structure, wherein the audio input device set includes a first audio input device (e.g., the first audio input device 611 of FIG. 5) which inputs an audio of a third direction vertical to a first direction, a second audio input device (e.g., the second audio input device 612 of FIG. 5) which inputs an audio of a fourth direction opposite to the third direction, a third audio input device (e.g., the third audio input device 613 of FIG. 5) which inputs an audio of the first direction, and a fourth audio input device (e.g., the fourth audio input device 614 of FIG. 5) which inputs the audio of the first direction in an unfolded state and inputs an audio of the second direction in the folded state.

According to an embodiment, the electronic device can further include a second display (e.g., the sub display 290 of FIG. 4) disposed in/at the first surface of one of the first housing structure or the second housing structure, and the first display can be disposed in/at the second surface. The second display may be part of, or separate from, the first display.

According to an embodiment, the hinge structure can switch the electronic device to the folding state or the unfolding state along a folding line, and the first audio input device and the second audio input device can be aligned in parallel to the folding line, and the third audio input device and the fourth audio input device can be aligned vertically to the folding line.

According to an embodiment, the electronic device can further include a sliding module (e.g., the sliding module 690 of FIG. 6D) moving to the side surface of the first housing or the second housing and being protruded, and the sliding module can mount at least one audio input device (e.g., the second audio input device 612 of FIG. 6D) included in the audio input device set.

According to an embodiment, the first audio input device, the second audio input device, and the third audio input device can be disposed in the second housing structure, and the fourth audio input device can be disposed in the first housing structure.

According to an embodiment, the first audio input device and the second audio input device can be disposed facing each other in the first side member.

According to an embodiment, the third audio input device and the fourth audio input device can be oriented in mutually opposite directions in the folding state, and be overlapped.

According to an embodiment, the second audio input device and the third audio input device can be disposed in the first housing structure, and the first audio input device and the fourth audio input device can be disposed in the second housing structure.

According to an embodiment, the hinge structure can switch the electronic device to the folding or unfolding state along the folding line (e.g., the folding line (F) of FIG. 6A), and the second audio input device and the third audio input device can be aligned in parallel to the folding line, and the first audio input device and the fourth audio input device can be aligned in parallel to the folding line.

According to an embodiment, the third audio input device and the fourth audio input device can be aligned vertically to the folding line.

According to an embodiment, the first display can be disposed in/at the first surface.

According to an embodiment, the audio input device set can be disposed in at least one of the first side member or the second side member.

The electronic device according to an embodiment can further include a memory (e.g., the memory 130 of FIG. 11), and a processor (e.g., the processor 120 of FIG. 11) operatively connected with the memory and the audio input device set. The processor can be configured to identify that the electronic device is switched from the unfolding state to the folding state in which the second surface of the first housing structure is overlapped with the second surface of the second housing structure, and in response to the identifying, inactivate the third audio input device exposed through the rear surface of the second housing, among the audio input device set including the first audio input device to the fourth audio input device, and change at least one beam pattern formed using at least one of the first audio input device, the second audio input device, or the fourth audio input device, to cover a beam formed using the third audio input device.

According to an embodiment, the changing of the beam pattern can change at least one of a phase or gain of at least one beam which is formed using the first audio input device, the second audio input device, or the fourth audio input device.

An electronic device according to an embodiment can include a foldable housing (e.g., the foldable housing 500 of FIG. 2) which includes a hinge structure (e.g., the hinge structure 540 of FIG. 4) which can switch the foldable housing to a folding state or an unfolding state, a first housing structure (e.g., the first housing structure 510 of FIG. 4) which is connected to the hinge structure, and includes a first surface oriented in a first direction and/or a second surface oriented in a second direction opposite to the first direction, and a second housing structure (e.g., the second housing structure 520 of FIG. 4) which is connected to the hinge structure, and includes a third surface oriented in a third direction and/or a fourth surface oriented in a fourth direction opposite to the third direction, and comes into contact with the first housing structure by pivoting about the hinge structure, a first display (e.g., the display 200 of FIG. 4) which extends from the first surface to the third surface and forms the first surface and the third surface, a second display (e.g., the sub display 201 of FIG. 4) which forms at least a portion of the second surface, and at least one audio input device (e.g., the first audio input device 611, the second audio input device 612, the third audio input device 613 and the fourth audio input device 614 of FIG. 6A) which is disposed in at least one of the second surface or the fourth surface.

According to an embodiment, the hinge structure switches the electronic device to the folding or unfolding state along the folding line, and the at least one audio input device can include the first audio input device (e.g., the first audio input device 611 of FIG. 6A) and the second audio input device (e.g., the second audio input device 612 of FIG. 6A) aligned in parallel to the folding line, and include the third audio input device (e.g., the third audio input device 613 of FIG. 6A) and the fourth audio input device (e.g., the fourth audio input device 614 of FIG. 6A) aligned vertically to the folding line.

According to an embodiment, the third audio input device can be aligned in parallel to the folding line together with the first audio input device and the second audio input device.

According to an embodiment, the first audio input device, the second audio input device, and the third audio input device can be disposed in the second housing structure, and the fourth audio input device can be disposed in the first housing structure.

According to an embodiment, the third audio input device and the fourth audio input device can be disposed in the second surface and the fourth surface respectively, and can be disposed to be oriented in mutually opposite directions in the folding state, and be overlapped with each other.

Methods of embodiments mentioned in the claims or specification of the present disclosure can be implemented in the form of hardware, software, or a combination of hardware and software.

In response to being implemented by software, a computer-readable storage media storing one or more programs (software modules) can be offered. The one or more programs stored in the computer-readable storage media are configured to be executable by one or more processors within an electronic device. The one or more programs include instructions for enabling the electronic device to execute the methods of the embodiments stated in the claims or specification of the present disclosure.

These programs (e.g., software modules and/or software) can be stored in a random access memory (RAM), a non-volatile memory including a flash memory, a read only memory (ROM), an electrically erasable programmable ROM (EEPROM), a magnetic disc storage device, a compact disc-ROM (CD-ROM), digital versatile discs (DVDs), an optical storage device of another form, and/or a magnetic cassette. Or, it can be stored in a memory that is configured in combination of some, or all, of them. Also, each configured memory can be included in the plural as well.

Also, the program can be stored in an attachable storage device that can access via a communication network such as Internet, an intranet, a local area network (LAN), a wireless LAN (WLAN) or a storage area network (SAN), or a communication network configured in combination of them. This storage device can access a device performing an embodiment of the present disclosure via an external port. Also, a separate storage device on the communication network can access the device performing the embodiment of the present disclosure as well.

In the aforementioned concrete embodiments of the present disclosure, a component included in the disclosure has been expressed in a singular form or a plural form according to a proposed concrete embodiment. But, the expression of the singular form or plural form is selected suitable to a given situation for description convenience's sake, and the present disclosure is not limited to singular or plural components. Even if it is a component expressed in the plural form, it can be constructed in the singular form, or even if it is a component expressed in the singular form, it can be constructed in the plural form.

On the other hand, in a detailed description of the present disclosure, a concrete embodiment has been described, but it is undoubted that various modifications are available without departing from the scope of the present disclosure. Therefore, the scope of the present disclosure should not be limited to and defined by the described embodiment and should be defined by not only claims stated later but also equivalents to these claims.

The invention claimed is:

1. An electronic device comprising:
a foldable housing which comprises a first surface oriented in a first direction in an unfolded state, a second surface oriented in a second direction opposite to the first direction in the unfolded state, and a side surface formed between the first surface and the second surface in the unfolded state,
the foldable housing comprising:
a hinge structure configured to allow the foldable housing to switch between a folded state and the unfolded state;
a first housing structure which is connected to the hinge structure and comprises a first side member at least partially surrounding a space between the first surface and the second surface; and
a second housing structure which is connected to the hinge structure and comprises a second side member, the second housing structure configured to be folded with the first housing structure by pivoting about the hinge structure,
wherein a second surface of the first housing structure faces a second surface of the second housing structure in a folded state, and wherein a first surface of the first housing structure and a first surface of the second housing structure face opposite directions in the folded state;
a first display overlapping with the first housing structure and the second housing structure, wherein the first display is bendable via pivot about a hinge shaft of the hinge structure; and
an audio input device set which is disposed in at least one of the first housing structure or the second housing structure,
wherein the audio input device set comprises:
a first audio input device which inputs an audio of a third direction vertical to the first direction;

a second audio input device which inputs an audio of a fourth direction opposite to the third direction;

a third audio input device which inputs an audio of the first direction; and a fourth audio input device which inputs the audio of the first direction in an unfolded state and inputs an audio of the second direction in the folded state.

2. The electronic device of claim 1, further comprising a second display disposed at the first surface of one of the first housing structure or the second housing structure, wherein the first display is disposed at the second surface of the first and second housing structure.

3. The electronic device of claim 2, wherein the hinge structure is configured to allow the electronic device to switch between the folded state and the unfolded state along a folding line, the first audio input device and the second audio input device are aligned substantially in parallel to the folding line, and the third audio input device and the fourth audio input device are aligned substantially vertically to the folding line.

4. The electronic device of claim 2, wherein the first audio input device, the second audio input device, and the third audio input device are disposed in the second housing structure, and the fourth audio input device is disposed in the first housing structure.

5. The electronic device of claim 4, wherein the first audio input device and the second audio input device are disposed facing each other in the first side member.

6. The electronic device of claim 4, wherein the third audio input device and the fourth audio input device are oriented in mutually opposite directions in the folding state, and are overlapped.

7. The electronic device of claim 2, wherein the second audio input device and the third audio input device are disposed in the first housing structure, and the first audio input device and the fourth audio input device are disposed in the second housing structure.

8. The electronic device of claim 7, wherein the hinge structure is configured to allow the electronic device to switch between the folded and the unfolded states along a folding line, the second audio input device and the third audio input device are configured to be aligned in parallel to the folding line, and the first audio input device and the fourth audio input device are configured to be aligned in parallel to the folding line.

9. The electronic device of claim 8, wherein the third audio input device and the fourth audio input device are configured to be aligned vertically to the folding line.

10. The electronic device of claim 1, further comprising a sliding module comprising a housing and configured to move relative to the side surface of the first housing and/or the second housing and being protruded, wherein the sliding module mounts at least one audio input device of the audio input device set.

11. The electronic device of claim 1, wherein the first display is disposed at the first surface.

12. The electronic device of claim 11, wherein the audio input device set is at least partially disposed in at least one of the first side member or the second side member.

13. The electronic device of claim 12, wherein the hinge structure is configured to allow the electronic device to switch between the folded state and the unfolded state along a folding line, the first audio input device and the second audio input device are configured to be aligned in parallel to the folding line, and the third audio input device and the fourth audio input device are configured to be aligned vertically to the folding line.

14. The electronic device of claim 11, further comprising:

a memory; and a processor operatively connected with the memory and the audio input device set, wherein the processor is configured to:

identify that the electronic device has switched from the unfolded state to the folded state in which the second surface of the first housing structure is overlapped with the second surface of the second housing structure;

in response to identifying that the electronic device has switched from the unfolded state to the folded state, inactivate the third audio input device exposed through the rear surface of the second housing, among the audio input device set comprising the first audio input device to the fourth audio input device; and change at least one beam pattern formed via at least one of the first audio input device, the second audio input device, or the fourth audio input device, to cover a beam formed using the third audio input device.

15. The electronic device of claim 14, wherein the change of the beam pattern is for changing at least one of a phase or gain of at least one beam which is formed via the first audio input device, the second audio input device, and/or the fourth audio input device.

16. The electronic device of claim 1, wherein each of the first, second, third, and fourth audio input devices each comprise a housing opening, the circuitry, and an audio conduit, wherein the audio conduit is defined in the housing and connected to the corresponding housing opening.

* * * * *